(12) United States Patent
Cook

(10) Patent No.: US 12,553,747 B2
(45) Date of Patent: Feb. 17, 2026

(54) MEASURING INSTRUMENT WITH ARC ENCODER TRACKS

(71) Applicant: Mitutoyo Corporation, Kanagawa-ken (JP)

(72) Inventor: Ted Staton Cook, Kirkland, WA (US)

(73) Assignee: MITUTOYO CORPORATION, Kanagawa-Ken (JP)

(*) Notice: Subject to any disclaimer, the term of this patent is extended or adjusted under 35 U.S.C. 154(b) by 159 days.

(21) Appl. No.: 18/391,294

(22) Filed: Dec. 20, 2023

(65) Prior Publication Data

US 2025/0207948 A1    Jun. 26, 2025

(51) Int. Cl.
*G01D 5/20* (2006.01)
(52) U.S. Cl.
CPC ..................... *G01D 5/20* (2013.01)
(58) Field of Classification Search
CPC .................................................. G01D 5/20
See application file for complete search history.

(56) References Cited

U.S. PATENT DOCUMENTS

| | | | |
|---|---|---|---|
| 4,428,121 A | 1/1984 | Yamazaki | |
| 5,104,225 A | 4/1992 | Masreliez | |
| 5,576,537 A | 11/1996 | Holzapfel et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,901,458 A | 5/1999 | Andermo et al. | |

(Continued)

FOREIGN PATENT DOCUMENTS

| | | |
|---|---|---|
| CN | 1272620 A | 11/2000 |
| CN | 1441226 A | 9/2003 |

(Continued)

OTHER PUBLICATIONS

BOGEN Magnetics GmbH, "Magnetic Measurement Solutions for Motion Control and Positioning," Motion Control Products, downloaded Nov. 19, 2021. (12 pages).

(Continued)

*Primary Examiner* — Akm Zakaria
(74) *Attorney, Agent, or Firm* — Seed Intellectual Property Law Group LLP

(57) ABSTRACT

A measuring instrument includes a movable portion configured to rotate in an arc motion about a pivot portion, and an electronic position encoder configured to measure an absolute relative position between a detector portion and a scale portion, one of which forms part of the movable portion. In the detector portion, first and second scale element portions of first and second track portions are arc-shaped and parallel to each other. In the scale portion, first signal modulating scale elements are disposed along a first scale element portion according to a first signal modulating element angular spatial step $\theta_{WSME1}$ and second signal modulating scale elements are disposed along a second scale element portion according to a second signal modulating element angular spatial step $\theta_{WSME2}$ that is different than the first signal modulating element angular spatial step $\theta_{WSME1}$.

20 Claims, 11 Drawing Sheets

(56) References Cited

U.S. PATENT DOCUMENTS

| | | |
|---|---|---|
| 5,936,399 A | 8/1999 | Andermo et al. |
| 5,937,533 A | 8/1999 | Meyer et al. |
| 5,960,552 A | 10/1999 | Ishii |
| 5,973,494 A | 10/1999 | Masreliez et al. |
| 5,998,990 A | 12/1999 | Andermo et al. |
| 6,002,250 A | 12/1999 | Masreliez et al. |
| 6,005,387 A | 12/1999 | Andermo et al. |
| 6,011,389 A | 1/2000 | Masreliez et al. |
| 6,049,204 A | 4/2000 | Andermo et al. |
| 6,054,851 A | 4/2000 | Masreliez et al. |
| 6,124,708 A | 9/2000 | Dames |
| 6,157,188 A | 12/2000 | Steinke |
| 6,259,249 B1 | 7/2001 | Miyata |
| 6,271,661 B2 | 8/2001 | Andermo et al. |
| 6,329,813 B1 | 12/2001 | Andermo |
| RE37,490 E | 1/2002 | Andermo et al. |
| 6,335,618 B1 | 1/2002 | Nahum |
| 6,400,138 B1 | 6/2002 | Andermo |
| 6,522,128 B1 | 2/2003 | Ely et al. |
| 6,522,129 B2 | 2/2003 | Miyata et al. |
| 6,531,866 B2 | 3/2003 | Miyata et al. |
| 6,545,461 B1 | 4/2003 | Miyata |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,664,535 B1 | 12/2003 | Nahum et al. |
| 6,714,004 B2 | 3/2004 | Jagiella |
| 6,720,760 B2 | 4/2004 | Milvich |
| 6,781,694 B2 | 8/2004 | Nahum et al. |
| 6,867,412 B2 | 3/2005 | Patzwald et al. |
| 6,925,727 B2 | 8/2005 | Ishii et al. |
| 7,015,687 B2 | 3/2006 | Meyer |
| 7,093,373 B2 | 8/2006 | Sugai et al. |
| 7,126,495 B2 | 10/2006 | Netzer |
| 7,196,510 B2 | 3/2007 | Kawatoko |
| 7,239,130 B1 | 7/2007 | Milvich |
| 7,307,736 B2 | 12/2007 | Tobiason et al. |
| 7,385,389 B2 | 6/2008 | Tahara et al. |
| 7,502,122 B2 | 3/2009 | Tobiason et al. |
| 7,530,177 B1 | 5/2009 | Meichle et al. |
| 7,578,072 B2 | 8/2009 | Hayashida et al. |
| 7,608,813 B1 | 10/2009 | Milvich et al. |
| 7,652,469 B2 | 1/2010 | Meyer |
| 7,705,585 B2 | 4/2010 | Howard |
| 7,906,958 B2 | 3/2011 | Nakayama et al. |
| 8,094,323 B2 | 1/2012 | Kapner |
| 8,222,891 B2 | 7/2012 | Steinke et al. |
| 8,256,129 B2 | 9/2012 | Adachi |
| 8,309,906 B2 | 11/2012 | Kapner et al. |
| 8,478,562 B2 | 7/2013 | Sasaki |
| 8,497,643 B2 * | 7/2013 | Takagi .................. H02K 41/03 318/135 |
| 8,847,583 B2 | 9/2014 | Sasaki et al. |
| 8,928,311 B2 | 1/2015 | Sasaki |
| 9,018,578 B2 | 4/2015 | Tobiason et al. |
| 9,121,733 B2 | 9/2015 | Asano |
| 9,127,967 B2 | 9/2015 | Nagura |
| 9,163,926 B2 | 10/2015 | Sasaki |
| 9,228,823 B2 | 1/2016 | Fontanet et al. |
| 9,267,819 B2 | 2/2016 | Cook |
| 9,383,184 B2 | 7/2016 | Tiemann et al. |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,772,202 B1 | 9/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,933,277 B2 | 4/2018 | Terauchi |
| 9,958,294 B2 | 5/2018 | Cook |
| 10,302,466 B2 | 5/2019 | Tobiason et al. |
| 10,422,666 B2 | 9/2019 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 10,648,838 B2 | 5/2020 | Tobiason |
| 10,775,199 B2 | 9/2020 | Cook |
| 11,067,414 B1 | 7/2021 | Cook |
| 11,175,121 B2 | 11/2021 | Zhong et al. |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0087928 A1 | 3/2018 | Jones |
| 2018/0094924 A1 * | 4/2018 | Horiguchi .......... G01D 5/24471 |
| 2018/0113004 A1 | 4/2018 | Cook |
| 2018/0180452 A1 | 6/2018 | Cook |
| 2018/0195880 A1 | 7/2018 | Cook |
| 2019/0120660 A1 | 4/2019 | Hitchman et al. |
| 2019/0301895 A1 | 10/2019 | Cook |
| 2020/0003581 A1 | 1/2020 | Cook et al. |
| 2020/0003583 A1 | 1/2020 | Cook |
| 2020/0012256 A1 * | 1/2020 | Mitterreiter .............. G01D 5/12 |
| 2021/0048315 A1 | 2/2021 | Meyer |
| 2021/0341312 A1 * | 11/2021 | Lange .................. G01B 7/003 |
| 2022/0042863 A1 | 2/2022 | Ichikawa et al. |
| 2022/0205814 A1 | 6/2022 | Cook |
| 2022/0341733 A1 | 10/2022 | Terautchi |
| 2023/0280145 A1 * | 9/2023 | Turner .................. G01B 5/012 33/503 |

FOREIGN PATENT DOCUMENTS

| | | |
|---|---|---|
| CN | 105415882 A | 3/2016 |
| EP | 1014041 A1 | 6/2000 |
| JP | 2006322927 A | 11/2006 |
| JP | 2008309687 A | 12/2008 |
| JP | 4869769 B2 | 2/2012 |
| JP | 2018004628 A | 1/2018 |
| JP | 2018031777 A | 3/2018 |
| JP | 2018105854 A | 7/2018 |

OTHER PUBLICATIONS

Ganssle, "A Designer's Guide to Encoders," Digikey, Apr. 19, 2012. (7 pages).
Eitel, "Basics of Rotary Encoders, Overview and New Technologies," MachineDesign, May 7, 2014, URL=https://www.machinedesign.com/automation-iiot/sensors/article/21831757/basics-of-rotary-encoders-overview-and-new-technologies, retrieved Feb. 13, 2024. (16 pages).
Heidenhain, "Internal Rotary Encoders," retrieved Oct. 2, 2023, from URL= https://www.heidenhain.com/products/rotary-encoders/internal. (3 pages).
Renishaw, "Partial Arc Absolute Encoders," retrieved Oct. 2, 2023, from URL= https://www.renishaw.com/en/partial-arc-absolute-encoders--45093. (1 page).
Wikipedia, Rotary encoder, retrieved on Nov. 25, 2023, from URL=https://en.wikipedia.org/wiki/Rotary encoder. (9 pages).

* cited by examiner

MEASURING INSTRUMENT WITH ARC ENCODER TRACKS

BACKGROUND

Technical Field

This disclosure relates to metrology and, more particularly, to measuring instruments, such as may include a moving member (e.g., a stylus) that rotates about a pivot portion in an arc motion and for which corresponding measurements are determined by an electronic position encoder, and for which some examples of such measuring instruments include test indicators, lever-type dial indicators, lever-type dial gauges, etc.

Description of the Related Art

Certain measuring instruments include a moveable member (e.g., including a stylus) that moves in an arc motion when utilized (e.g., for determining measurements of a workpiece that is being inspected). As an example, a test indicator (e.g., sometimes also referenced as a lever indicator, lever-type dial indicator, lever-type dial gauge, etc.) is described in U.S. Patent Publication No. 2022/0341733 (the '733 publication), which includes a stylus that rotates around a pivot portion with a corresponding rotation angle (e.g., in an arc motion). A rotation of the stylus results in a movement of a sector gear on an opposite side of the pivot portion, which correspondingly rotates an encoder that detects a rotation angle. As described, such test indicators may be utilized to inspect workpieces (e.g., with a contact point of the stylus pressed against a surface of the workpiece), such as for measuring minute displacements, such as circumferential flexure, total flexure, flatness, and parallelism, and for a precise comparison inspection, such as for determining a machining error of a machined workpiece, etc.

In certain implementations, it may be desirable for such measuring instruments to include encoders (e.g., for measuring such arc motions) that provide desirable combinations of features, such as combinations of compact size, high resolution, accuracy, low cost, robustness to contamination, etc. Configurations of encoders that provide improved combinations of such features in such measuring instruments would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, a measuring instrument is provided which includes a movable portion and an electronic position encoder. The movable portion is configured to rotate in an arc motion about a pivot portion, and includes a movable encoder portion MEP, for which a maximum movement range of the arc motion of the movable encoder portion MEP is less than 360 degrees.

The electronic position encoder is configured to measure an absolute relative position between a detector portion and a scale portion, for example along an arc motion direction. The movable encoder portion MEP of the movable portion includes one of the detector portion or the scale portion. The scale portion extends along a scale direction, and includes a first scale element portion comprising first signal modulating scale elements; and a second scale element portion comprising second signal modulating scale elements. The detector portion is configured to be proximate to the scale portion with relative movement between the detector portion and the scale portion resulting from the arc motion of the movable encoder portion MEP. The detector portion includes a field generating portion configured to generate changing magnetic flux in response to drive signals; and a sensing portion. The sensing portion includes a first sensing element portion comprising a first set of first sensing elements and arranged in a first track portion with the first scale element portion; and a second sensing element portion comprising a first set of second sensing elements and arranged in a second track portion with the second scale element portion.

The first and second scale element portions of the first and second track portions are arc-shaped and are parallel to each other, with the second track portion closer to the pivot portion than the first track portion. The first signal modulating scale elements are disposed along the first scale element portion according to a first signal modulating element angular spatial step $\theta_{WSME1}$ and the second signal modulating scale elements are disposed along the second scale element portion according to a second signal modulating element angular spatial step $\theta_{WSME2}$ that is different than the first signal modulating element angular spatial step $\theta_{WSME1}$.

In accordance with another aspect, a method is provided for operating the measuring instrument including the movable portion and an electronic position encoder. The method includes:

providing drive signals to cause the field generating portion to generate changing magnetic flux; and receiving detector signals from the detector portion, wherein the detector signals include: detector signals from the first set of first sensing elements that operate in conjunction with first signal modulating scale elements; and detector signals from the first set of second sensing elements that operate in conjunction with second signal modulating scale elements. In accordance with the method, the first and second scale element portions of the first and second track portions are arc-shaped and are parallel to each other, with the second track portion closer to the pivot portion than the first track portion; the first signal modulating scale elements are disposed along the first scale element portion according to a first signal modulating element angular spatial step $\theta_{WSME1}$ and the second signal modulating scale elements are disposed along the second scale element portion according to a second signal modulating element angular spatial step $\theta_{WSME2}$ that is different than the first signal modulating element angular spatial step $\theta_{WSME1}$.

According to a further aspect, the electronic position encoder is provided which is configured to measure an absolute relative position between the detector portion and the scale portion, for example along an arc motion direction, and to be utilized in the measuring instrument that comprises the movable portion configured to rotate in an arc motion about a pivot portion.

DETAILED DESCRIPTION

Figure 1:
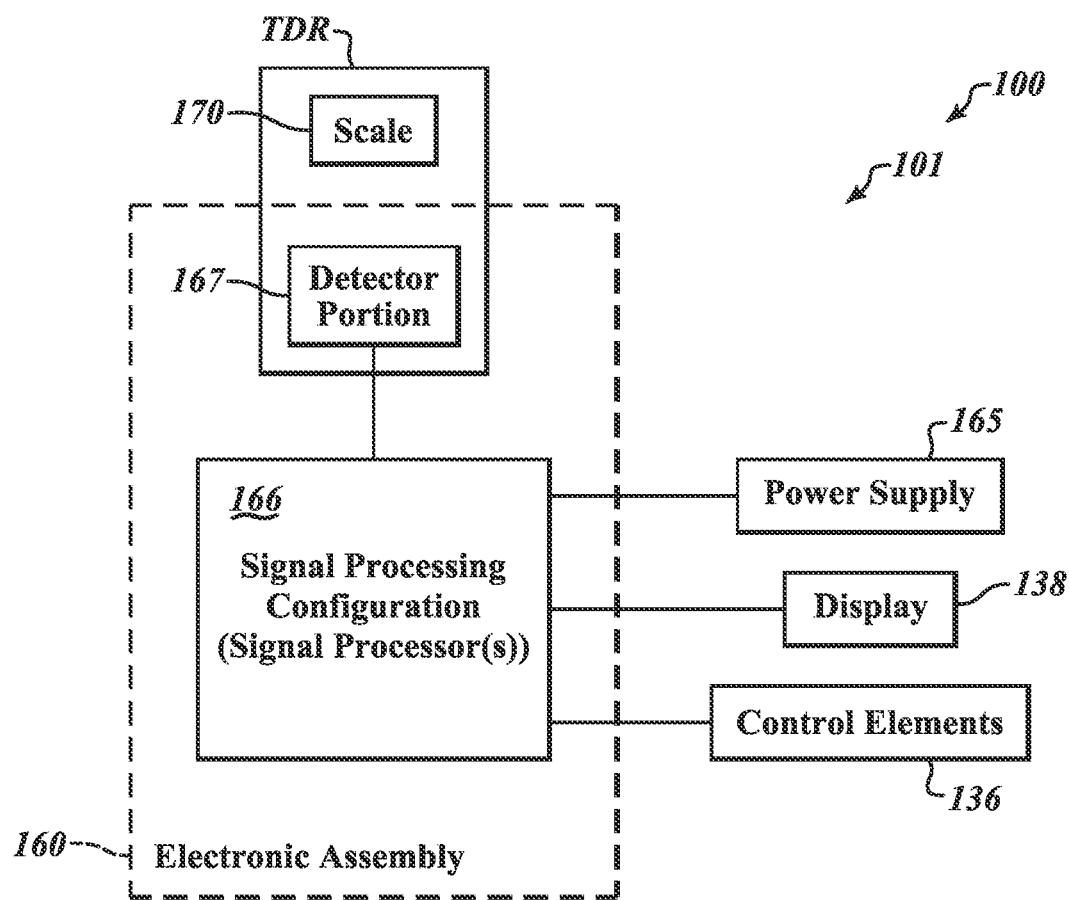
FIG. 1 is a diagram of a measuring instrument including an electronic position encoder with a transducer including a detector portion and a scale portion.

FIG. 1 is a block diagram of exemplary components of a measuring instrument 100 (e.g., a test indicator) including an electronic absolute position encoder 101. In various implementations, the electronic absolute position encoder 101 includes a scale portion 170 and a detector portion 167, which together form a transducer TDR. As will be described in more detail below, the encoder 101 as utilized herein is an absolute (ABS) position encoder utilizing two or more encoder tracks to provide absolute positioning (i.e., every position within the absolute range of the encoder 101 has a unique combination of signals). In general, ABS encoding may be more robust than incremental (INC) encoding (e.g., which counts increments while moving) and therefore more desirable for certain implementations (e.g., can tolerate power cycle without losing position, etc.). The measuring instrument 100 includes suitable user interface features such as a display 138 and/or user-operable control elements 136 (e.g., switches, buttons, etc.) The measuring instrument 100 may additionally include a power supply 165.

All of these elements of the measuring instrument 100 and/or encoder 101 are coupled to a signal processing configuration 166 (e.g., including one or more signal processors), which in various implementations may be embodied as a signal processing and display electronic circuit in integrated circuit (IC) chip(s). The signal processing configuration 166 receives detector signals from the detector portion 167 and processes the detector signals to determine an absolute position of the detector portion 167 along the scale portion 170. It will be appreciated that the signal processing configuration 166 may comprise any combination of signal processing and physical circuitry. In various implementations, the signal processing configuration 166 and the detector portion 167 may be included as part of an electronic assembly 160 (e.g., as arranged on a substrate, etc.)

Figure 2:
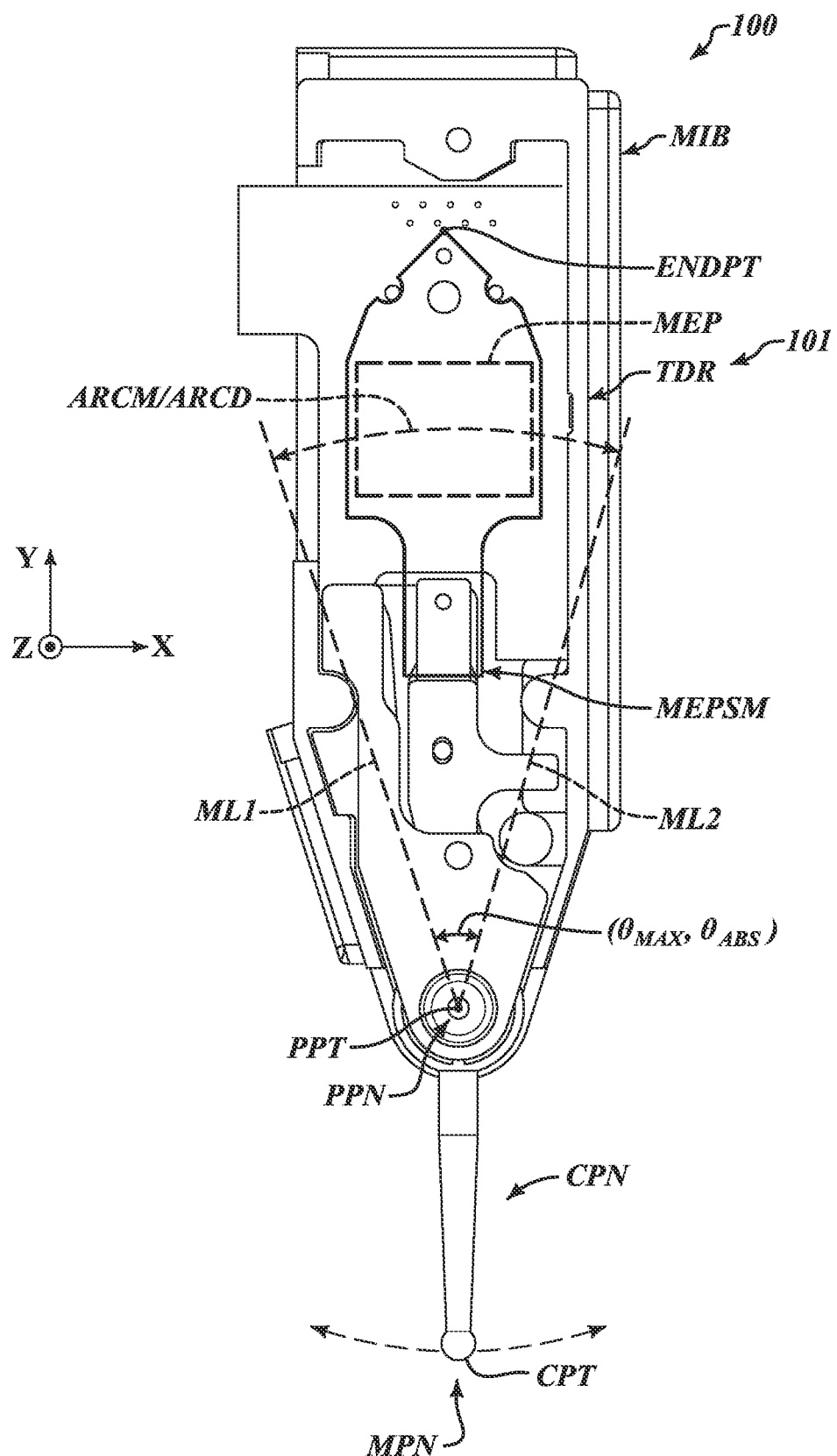
FIG. 2 is a diagram illustrating additional detail of one implementation of a measuring instrument such as that of FIG. 1.

FIG. 2 is a diagram illustrating additional detail of one implementation of a measuring instrument 100 such as that of FIG. 1. As will be described in more detail below, the measuring instrument 100 includes an electronic position encoder 101, which includes a transducer TDR. In the example of FIG. 2, the measuring instrument 100 is a test indicator (e.g., sometimes also referenced as a lever indicator, lever-type dial indicator, lever-type dial gauge, etc.). In various implementations, certain aspects of the mechanical structure and operation of the measuring instrument 100 may be similar to that of certain prior test indicators, such as that described in the previously incorporated '733 publication.

As illustrated in FIG. 2, a contact portion CPN (e.g., a stylus) is coupled to and rotates around a pivot portion PPN (e.g., rotates around a pivot point PPT of the pivot portion PPN) with a corresponding angle (e.g., in an arc motion). The contact portion CPN includes a contact point CPT at an end thereof, such as may be utilized for contacting workpieces for performing measurement operations (e.g., such as for measuring displacements and/or dimensions, etc. of the workpiece). A measurement may be displayed on a digital display (e.g., display 138 of FIG. 1), such as may be mounted on a measuring instrument body MIB or other location of the measuring instrument 100. Certain control elements may also be provided (e.g., control elements 136 of FIG. 1) on the measuring instrument 100.

A moveable portion MPN of the measuring instrument 100 includes the contact portion CPN on a first side of the pivot portion PPN, and a moveable encoder portion support member MEPSM which supports a moveable encoder portion MEP on a second side of the pivot portion PPN. The moveable portion MPN is configured such that a workpiece measurement operation (e.g., for measuring a workpiece) that causes the contact portion CPN to rotate in relation to the pivot portion PPN (e.g., resulting from the contact point CPT contacting or otherwise moving along a surface of a workpiece) correspondingly causes the support member MEPSM and the moveable encoder portion MEP to rotate in an arc motion ARCM (e.g., in an arc motion direction ARCD). In the measuring instrument 100, a maximum angular movement range $\theta_{MAX}$ of the arc motion ARCM of the moveable encoder portion MEP is less than 360 degrees (e.g., and in some implementations, may be less than 90 degrees, or 45 degrees, or 15 degrees, etc.). Such relatively smaller angular movement ranges are typical for certain types of measuring instruments, in particular for applications where only relatively small deflections of the contact portion CPM (e.g., a stylus) are utilized for measuring a workpiece.

In various implementations, the moveable encoder portion MEP may include one of the detector portion 167 or the scale portion 170 (e.g., as described above with respect to FIG. 1, and as will be described in more detail below with respect to FIG. 3). The other of the detector portion 167 or the scale portion 170 that is not included in the moveable encoder portion MEP is included in a fixed encoder portion FEP (not shown, but may be fixed to the measuring instrument body MIB for example) at a location proximate to the moveable encoder portion MEP. In one specific illustrative example, the movable encoder portion MEP may be arranged parallel with and facing the fixed encoder portion FEP, and a front face of the movable encoder portion MEP that faces the fixed encoder portion FEP may be separated from the fixed encoder portion FEP by a gap (e.g., on the order of 0.1 mm-0.2 mm) along the z-axis direction. Regardless of whether the detector portion 167 is included in the movable encoder portion MEP or the fixed encoder portion FEP, the front face of the detector portion 167 (e.g., including its constituent conductors) may be covered by an insulative coating.

In the orientation of FIG. 2, the fixed encoder portion FEP may be located directly beneath the moveable encoder portion MEP (and thus is not visible in FIG. 2). The fixed encoder portion FEP and the moveable encoder portion MEP (e.g., which are noted to include the detector portion 167 and the scale portion 170) correspondingly form the transducer TDR. As described above, relative movement between the moveable encoder portion MEP and the fixed encoder portion FEP (i.e., which corresponds to relative movement between the detector portion 167 and the scale portion 170) results from movement of the moveable encoder portion MEP in the arc motion direction ARCD, as resulting from movements of the contact portion CPN (e.g., as part of workpiece measurement operations).

As shown in FIG. 2, first and second movement limit indicators ML1 and ML2 are illustrated as dotted lines, which indicate a maximum movement range of the arc motion ARCM (e.g., including of the moveable encoder portion MEP) and as corresponding to the maximum angular movement range $\theta_{MAX}$. The electronic position encoder 101 is an absolute position encoder which utilizes two or more encoder tracks (e.g., see FIG. 3) to provide absolute positioning (i.e., for which every position has a unique combination of signals), as corresponding to an absolute angular measurement range $\theta_{ABS}$, as will be described in more detail below. In the example of FIG. 2, the absolute angular measurement range $\theta_{ABS}$ is indicated as being approximately equal to the maximum angular movement range $\theta_{MAX}$, although it will be appreciated that in alternative implementations, the absolute angular measurement range $\theta_{ABS}$ and the maximum angular movement range $\theta_{MAX}$ may be different (e.g., in most such implementations with the absolute angular measurement range $\theta_{ABS}$ being larger than the maximum angular movement range $\theta_{MAX}$, and in all cases with the absolute angular measurement range $\theta_{ABS}$ being less than 360 degrees). It will be appreciated that for certain implementations, the absolute angular measurement range $\theta_{ABS}$ and the maximum angular movement range $\theta_{MAX}$ are shown in the example of FIG. 2 for purposes of illustration and may not be to scale.

An endpoint ENDPT at the end of the moveable encoder portion support member MEPSM also corresponds to an endpoint of the moveable portion MPN. The endpoint ENDPT is at an opposite end of the moveable portion MPN in relation to the contact point CPT at the end of the contact portion CPN. As referenced herein, the contact portion CPN and the contact point CPT are on a first side of the pivot portion PPN, and the support member MEPSM, moveable encoder portion MEP and endpoint ENDPT are on a second side of the pivot portion PPN.

It will be appreciated that the measuring instrument of FIGS. 1 and 2 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. Even small improvements in any of these factors in any of these applications are highly desirable, but difficult to achieve, especially in light of the design constraints imposed in order to achieve commercial success in the various applications. The principles disclosed herein provide improvements in certain of these factors for various applications.

Figure 11:
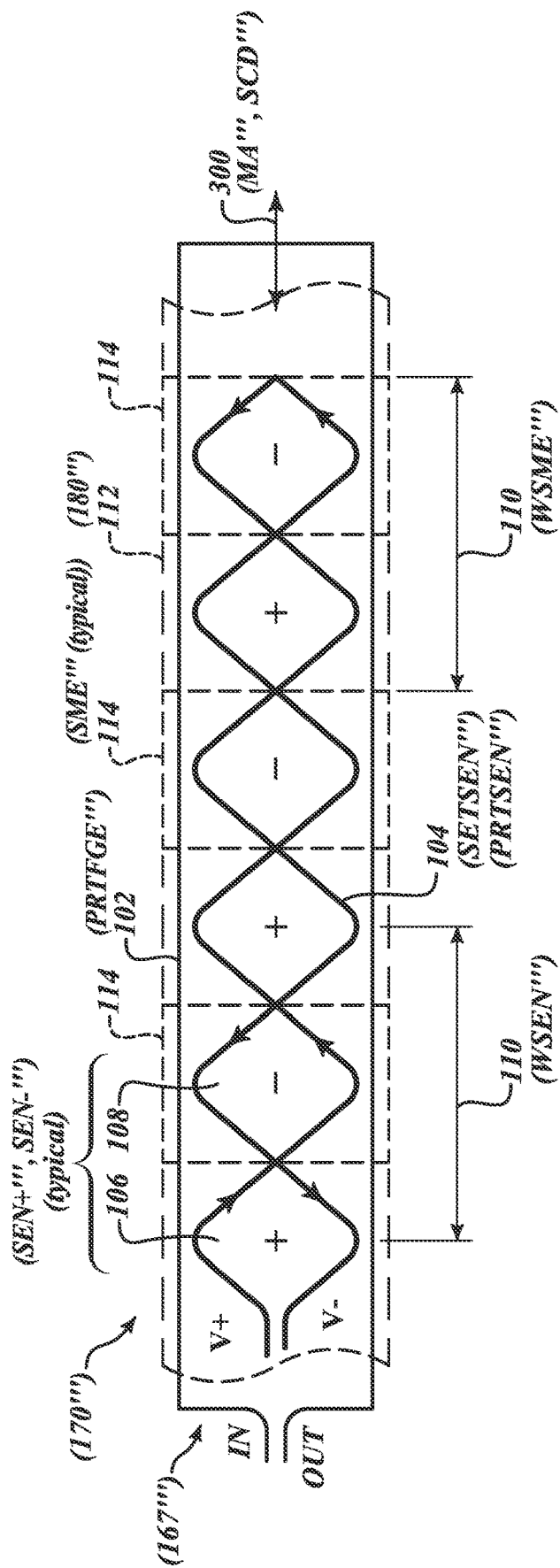
FIG. 11 is a plan view diagram schematically illustrating certain features of a representative prior art electronic position encoder configured to be utilized with linear motion between a detector portion and a scale portion, presented as background information that is relevant to various principles described herein.

FIG. 11 is a plan view diagram schematically illustrating certain features of a representative prior art inductive electronic position encoder shown in U.S. Pat. No. 6,011,389 (the '389 patent), which is hereby incorporated herein by reference in its entirety, and which is presented as background information that is relevant to various principles disclosed elsewhere herein. FIG. 11 furthermore includes reference numeral annotations to show the comparable reference numerals or symbols used to designate comparable elements in other figures included herein. In the following abbreviated description, which is based on the disclosure of the '389 patent, some of the comparable reference numbers or symbols in other figures of the present disclosure are shown in parentheses proximate to the original reference numerals from the '389 patent. A full description related to the prior art FIG. 11 may be found in the '389 patent. Therefore, only an abbreviated description (e.g., including certain teachings from the '389 patent that are relevant to the present disclosure) is included here.

As disclosed in the '389 patent, a transducer such as that shown in FIG. 11 includes at least two substantially coplanar paths of wire or windings. A transmitter winding 102 (PRTFGE''') forms a large planar loop. In this example, the transmitter winding 102 forms an entire field generating portion PRTFGE'''. A receiver winding 104 (PRTSEN''', SETSEN'''), in substantially the same plane as the transmitter winding 102, is laid out in one direction as indicated by the arrows in a zig-zag or sinusoidal pattern and then in a reverse direction as indicated by the arrows so that the winding crosses over itself to form alternating loops 106 (SEN+''') and 108 (SEN−''') interposed between each other, as shown. As a result, each of the alternating loops 106 (SEN+''') and 108 (SEN−''') of the receiver winding 104 (PRTSEN''', SETSEN''') have a different winding direction as compared to adjacent loops. By applying an alternating (changing) current to the transmitter winding 102 (PRTFGE'''), the transmitter winding produces a time-varying magnetic field (a changing magnetic flux), extending through the loops 106 (SEN+''') and 108 (SEN−''') of the receiver winding 104 (PRTSEN''', SETSEN'''). In various implementations, the loops 106 (SEN+''') and 108 (SEN−''') may be designated as a set of sensing elements (SETSEN''') of a sensing portion (PRTSEN''').

If a scale portion (170''') or scale pattern 112 (180''') (a segment of which is outlined by edges indicating alternating long-dash lines and short-dash lines in FIG. 11), including a conductive object (e.g., a signal modulating element such as a conductive plate 114 (SME'''), several of which are outlined using short-dash lines on the scale pattern 112 in FIG. 11), is moved close (proximate) to the detector portion (167'''), the varying magnetic field generated by the transmitter winding 102 (PRTFGE''') will induce eddy currents in the conductive object, which in turn sets up a magnetic field from the object that counteracts the varying transmitter magnetic field (the changing magnetic flux). As a result, the magnetic flux that the receiver winding 104 (PRTSEN''') receives is altered or disrupted, thereby causing the receiver winding to output a non-zero EMF signal (a voltage) at the output terminals V+ and V− of the receiver winding 104, which will change polarity as the conductive object moves between the "+" and "−" loops 106 (SEN+''') and 108 (SEN−''').

The distance between the location of two loops of the same polarity, (e.g., between the location of a loop 106 (SEN+''') to the location of the next loop 106 (SEN+''')) is defined as a linear spatial step (e.g., which may also be referenced as a pitch or wavelength) 110 (WSEN''') of the set of sensing elements (SETSEN'''), and in certain implementations may be equal to a linear spatial step (e.g., which may also be referenced as a pitch or wavelength) 110 (WSME''') of the scale pattern (180''') of the scale portion (170''') as disposed along the scale direction SCD''' and/or measuring axis direction MA'''. It may be seen that each loop 106 (SEN+''') and/or 108 (SEN−''') therefore has a length or maximum dimension 0.5*(WSEN''') along the measuring axis direction (MA'''), which may also be referenced as the scale direction SCD'''. If the conductive object described above (e.g., a conductive plate 114 (SME''')) is proximate to the receiver winding 104 (PRTSEN''') and is continuously varied in position along a measuring axis 300 (MA'''), the AC amplitude of the signal output from the receiver winding (PRTSEN''') will vary continuously and periodically with the linear spatial step (e.g., which may also be referenced as a pitch or wavelength) 110 (WSME''') due to the periodic alteration of the loops 106 (SEN+''') and 108 (SEN−''') and local disruption of the transmitted magnetic field caused by the conductive object (e.g., a conductive plate 114 (SME''')). The signal output from the receiver winding (PRTSEN''') may thus be utilized (e.g., processed) to indicate a relative position between the detector portion (167''') and the scale portion (170'''). It will be appreciated that the transmitter winding 102 (PRTFGE''') and the receiver winding 104 (PRTSEN''') shown in FIG. 11 and described above are one example of a prior art implementation of elements that are designated as a detector portion (167''').

Figure 3:
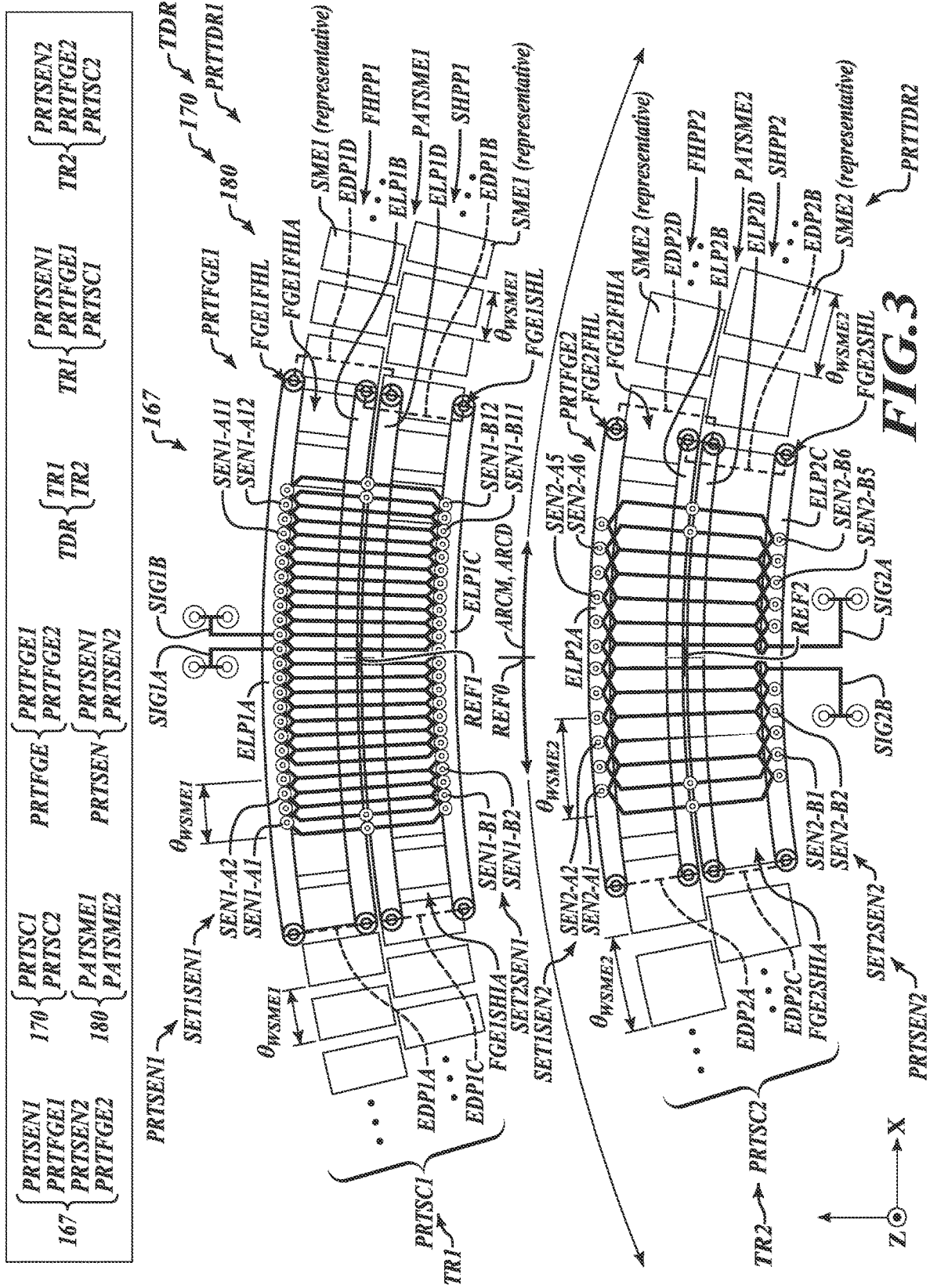
FIG. 3 is a diagram of an implementation of a portion of a transducer configured to be utilized with arc motion between a detector portion and a scale portion such as may be utilized in the measuring instrument of FIG. 2.

FIG. 3 is a diagram of an implementation of a portion of a transducer TDR configured to be utilized with arc motion ARCM between a detector portion 167 and a scale portion 170, such as may be utilized in the electronic position encoder 101 of the measuring instrument 100 of FIGS. 1 and 2. The transducer TDR utilizes two track portions TR1 and TR2 as illustrated in FIG. 3.

It will be appreciated that certain aspects of the field generating elements and sensing elements of a detector portion (e.g., detector portion 167, etc.) as described herein may operate and be understood based at least in part on principles as described above with respect to FIG. 11. In the implementation of FIG. 3, the scale portion 170, the detector portion 167 and a signal processing configuration 166 (e.g., of FIGS. 1 and 2) work cooperatively to provide the electronic position encoder 101 that is usable to measure a relative position between two elements (e.g., between the detector portion 167 and the scale portion 170 and/or elements attached thereto), such as along an arc motion direction. In various implementations, the detector portion 167 is formed on a detector substrate, and the scale portion 170 including the periodic scale pattern 180 is formed on a scale substrate, and for which measurement operations include relative movements between the two substrates (e.g., which may be relatively planar and parallel to one another). In various implementations, the detector portion 167 and the scale portion 170 may generally be in respective planes that extend along the x-axis direction and the y-axis direction, with a z-axis direction being orthogonal to the planes.

In various implementations, the scale portion 170 extends along the scale direction SCD and includes a first scale element portion PRTSC1 including first signal modulating elements SME1 and a second scale element portion PRTSC2 including second signal modulating element SME2. The first signal modulating elements SME1 are disposed along the scale direction SCD according to, and thus form, a first signal modulating element pattern PATSME1. The second signal modulating elements SME2 are disposed along the scale direction SCD according to, and thus form, a second signal modulating element pattern PATSME2. The first signal modulating element pattern PATSME1 and the second signal modulating element pattern PATSME2 are respective parts of a periodic scale pattern 180 of the scale portion 170. In various implementations, the periodic scale pattern 180 may alternatively be referred to as a signal modulating pattern 180. In various implementations, the first and/or second signal modulating elements SME1 and SME2 (i.e., as included in the first and second scale element portions PRTSC1 and PRTSC2) may be fabricated on a scale substrate (e.g., using known printed circuit fabrication methods).

The relative movement between the detector portion 167 and the scale portion 170 (e.g., in an arc motion direction) may indicate relative positions and/or measurements (e.g., in relation to the relative positions between the detector portion 167 and the scale portion 170). As described above with respect to FIGS. 1 and 2, a measured relative position or dimension may be displayed on a display 138 (e.g., a digital display). In various implementations, control elements 136 such as an on/off switch and other optional control buttons may be included.

As shown in FIG. 3, the detector portion 167 may include a field generating portion PRTFGE and a sensing portion PRTSEN arranged along the scale direction SCD. In various implementations, in relation to the sensing portion PRTSEN, the scale direction SCD may also or alternatively be referred to as a sensing portion direction SPD. The field generating portion PRTFGE includes a first field generating element portion PRTFGE1 and a second field generating element portion PRTFGE2. The sensing portion PRTSEN includes a first sensing element portion PRTSEN1 and a second sensing element portion PRTSEN2. As will be described in more detail below, the first sensing element portion PRTSEN1 is configured to operate in conjunction with the first field generating element portion PRTFGE1 and the first scale element portion PRTSC1 as part of a first track portion TR1, and the second sensing element portion PRTSEN2 is configured to operate in conjunction with the second field generating element portion PRTFGE2 and the second scale element portion PRTSC2 as part of a second track portion TR2.

In various implementations, the field generating portion PRTFGE may include a number of elongated portions ELP and end portions EDP. The elongated portions may generally extend along, and thus be parallel to, the scale direction SCD, while the end portions may generally be transverse (e.g., perpendicular) to the scale direction SCD. The elongated portions ELP and end portions EDP in combination may form areas (e.g., in which changing magnetic flux may be generated by current flow through the elongated portions and end portions that results from drive signals) and for which the areas may include certain of the sensing elements.

In various implementations, the field generating portion PRTFGE may include first and second field generating element portions PRTFGE1 and PRTFGE2. The first field generating element portion PRTFGE1 is configured to operate in conjunction with the first sensing element portion PRTSEN1 and with first signal modulating elements SME1 of the first scale element portion PRTSC1. The first field generating element portion PRTFGE1 includes elongated portions ELP1A, ELP1B, ELP1C, ELP1D and end portions EDP1A, EDP1B, EDP1C, EDP1D (e.g., which in some implementations may be regarded as forming two field generating element loops, such as in a figure-8 configuration, and/or otherwise as a single field generating element loop that forms two loops in such a configuration as to form two interior areas). More specifically, the elongated portions ELP1A and ELP1B and end portions EDP1A and EDP1D may be regarded as forming a first field generating element first half loop FGE1FHL with an interior area FGE1FHIA. The first field generating element first half interior area FGE1FHIA is configured to be aligned with the first half pattern portion FHPP1 of the first scale element portion PRTSC1. The elongated portions ELP1C and ELP1D and end portions EDP1C and EDP1B may be regarded as forming a first field generating element second half loop FGE1SHL with an interior area FGE1SHIA. The first field generating element second half interior area FGE1SHIA is configured to be aligned with the second half pattern portion SHPP1 of the first scale element portion PRTSC1.

In various implementations, an end portion EDP (e.g., or other part of the first field generating element portion PRTFGE1) may include a port or other connection configuration. For example, the end portion EDP1B may be divided into two parts, such as with two contact points provided. The contact points may be used to receive drive signals and may be provided at locations where signal lines/circuit traces from the processing portion 166 may connect, etc. In various implementations, such a port may be representative of a general connection configuration, such as coupled to field generating drive electronics. Such field generating drive electronics may in various implementations include electronic components such as capacitors, transistors, etc., and as may be at least partially or fully included in or coupled to the processing portion 166, to provide the drive signals for causing the first field generating element portion PRTFGE1 to generate changing magnetic flux.

During operations, alternating current may be provided, although in order to simplify the following description only one direction of current is described (e.g., for purposes of example of one direction and/or as may occur in configurations where diodes or other components/configurations are provided to limit the current flow to one direction). As one example, current (e.g., as provided by drive signals), may flow through the following sequence of portions (e.g., in the following order for current in one direction), including: end portion EDP1D; elongated portion ELP1A; end portion EDP1A; elongated portion ELP1B; and end portion EDP1B; elongated portion ELP1C; end portion EDP1C; and elongated portion ELP1D. In accordance with this example of current flow, it will be appreciated that the current flow is in the same direction (e.g., left to right in the illustration of FIG. 3) through the elongated portions (i.e., elongated portions ELP1A and ELP1C) at the outer boundaries of the configuration, and is in the same direction (i.e., right to left in the illustration of FIG. 3) through the elongated portions (i.e., elongated portions ELP1B and ELP1D) in the middle of the configuration. This also corresponds to current flow around the first field generating element first half loop FGE1FHL in a counter-clockwise direction, and current flow around the first field generating element first half loop FGE1SHL in a clockwise direction (i.e., for which the directions of current flow through the respective loops are noted to be opposite, with corresponding opposite polarities of the resulting magnetic flux from each respective loop).

Such directions/orientations/polarities of current flow and corresponding magnetic flux may be advantageous for certain configurations, such as resulting in generated signals in first sensing elements SEN1 (e.g., such as at least partially aligned with the interior areas FGE1FHIA and FGE1SHIA of the first field generating element portion PRTFGE1). As one aspect, it is noted that in relation to the opposite directions of current flow and corresponding opposite polarities of the magnetic flux generated by the respective loops FGE1FHL and FGE1SHL, the spatially offset first and second half pattern portions FHPP1 and SHPP1 will result in detector signals (i.e., from the first sensing element portion PRTSEN1) that indicate the position of the first sensing element portion PRTSEN1 relative to the first scale element portion PRTSC1.

The second field generating element portion PRTFGE2 is configured to operate in conjunction with the second sensing element portion PRTSEN2 and with second signal modulating elements SME2 of the second scale element portion PRTSC2. The second field generating element portion PRTFGE2 includes elongated portions ELP2A, ELP2B, ELP2C, ELP2D and end portions EDP2A, EDP2B, EDP2C, EDP2D (e.g., which in some implementations may be regarded as forming two field generating element loops, such as in a figure-8 configuration, and/or otherwise as a single field generating element loop that forms two loops in such a configuration as to form two interior areas). More specifically, the elongated portions ELP2A and ELP2B and end portions EDP2A and EDP2D may be regarded as forming a second field generating element first half loop FGE2FHL with an interior area FGE2FHIA. The second field generating element first half interior area FGE2FHIA is configured to be aligned with the first half pattern portion FHPP2 of the second scale element portion PRTSC2. The elongated portions ELP2C and ELP2D and end portions EDP2C and EDP2B may be regarded as forming a second field generating element second half loop FGE2SHL with an interior area FGE2SHIA. The second field generating element second half interior area FGE2SHIA is configured to be aligned with the second half pattern portion SHPP2 of the second scale element portion PRTSC2.

In various implementations, an end portion EDP (e.g., or other part of the second field generating element portion PRTFGE2) may include a port or other connection configuration. For example, the end portion EDP2B may be divided into two parts, such as with two contact points provided. The contact points may be used to receive drive signals and may be provided at locations where signal lines/circuit traces from the processing portion 266 may connect, etc. In various implementations, such a port may be representative of a general connection configuration, such as coupled to field generating drive electronics. Such field generating drive electronics may in various implementations include electronic components such as capacitors, transistors, etc., and as may be at least partially or fully included in or coupled to the processing portion 266, to provide the drive signals for causing the second field generating element portion PRTFGE2 to generate changing magnetic flux.

During operations, alternating current may be provided, although in order to simplify the following description only one direction of current is described (e.g., for purposes of example of one direction and/or as may occur in configurations where diodes or other components/configurations are provided to limit the current flow to one direction). As one example, current (e.g., as provided by drive signals), may flow through the following sequence of portions (e.g., in the following order for current in one direction), including: end portion EDP2D; elongated portion ELP2A; end portion EDP2A; elongated portion ELP2B; and end portion EDP2B; elongated portion ELP2C; end portion EDP2C; and elongated portion ELP2D. In accordance with this example of current flow, it will be appreciated that the current flow is in the same direction (e.g., left to right in the illustration of FIG. 3) through the elongated portions (i.e., elongated portions ELP2A and ELP2C) at the outer boundaries of the configuration, and is in the same direction (i.e., right to left in the illustration of FIG. 3) through the elongated portions (i.e., elongated portions ELP2B and ELP2D) in the middle of the configuration. This also corresponds to current flow around the second field generating element first half loop FGE2FHL in a counter-clockwise direction, and current flow around the second field generating element first half loop FGE2SHL in a clockwise direction (i.e., for which the directions of current flow through the respective loops are noted to be opposite, with corresponding opposite polarities of the resulting magnetic flux from each respective loop).

Such directions/orientations/polarities of current flow and corresponding magnetic flux may be advantageous for certain configurations, such as resulting in generated signals in second sensing elements SEN2 (e.g., such as at least partially aligned with the interior areas FGE2FHIA and FGE2SHIA of the second field generating element portion PRTFGE2). As one aspect, it is noted that in relation to the opposite directions of current flow and corresponding opposite polarities of the magnetic flux generated by the respective loops FGE2FHL and FGE2SHL, the spatially offset first and second half pattern portions FHPP2 and SHPP2 will result in detector signals (i.e., from the second sensing element portion PRTSEN2) that indicate the position of the second sensing element portion PRTSEN2 relative to the second scale element portion PRTSC2.

As noted above, the sensing portion PRTSEN includes the first and second sensing element portions PRTSEN1 and PRTSEN2 (e.g., with each including respective sensing elements SEN1 and SEN2). In the illustrated implementation, the sensing elements SEN1 and SEN2 comprise sensing loop elements (alternatively referred to as sensing coil elements or sensing winding elements) which are connected in series and are generally transverse (e.g., nominally perpendicular) relative to the scale direction SCD. The first sensing element portion PRTSEN1 includes a first set of first sensing elements SET1SEN1 and a second set of first sensing elements SET2SEN1. The second sensing element portion PRTSEN2 includes a first set of second sensing elements SET1SEN2 and a second set of second sensing elements SET2SEN2. In the illustrated implementation, adjacent loop elements (e.g., conductive loops) in each respective set of sensing elements are connected by a configuration of conductors on various layers of PCB (e.g., connected by feedthroughs which in some implementations may include conductors passing through micro-vias, which may also be referenced as blind vias or buried vias) according to known methods. For example, the adjacent sensing elements SEN1 in each set of the first sensing element portion PRTSEN1, and the adjacent sensing elements SEN2 in each set of the second sensing element portion PRTSEN2, may have opposite winding polarities (e.g., with the sensing elements in each respective set alternating between SEN+ and SEN−, such as described above with respect to FIG. 11). That is, if a first loop corresponding to a sensing element responds to a changing magnetic field with a positive polarity detector signal contribution, then the adjacent loops corresponding to adjacent sensing elements respond with a negative polarity detector signal contribution. Loops having a positive polarity detector signal contribution may be designated SEN+ sensing elements herein, and loops having a negative polarity detector signal contribution may be designated SEN− sensing elements in various contexts herein. In various implementations, the sensing elements in each respective set are connected in series such that their detector signals or signal contributions are summed per set, and a "summed" detector signal is output at detector signal output connections (e.g., at the connections for each of the signals SIG1A and SIG1B, and SIG2A and SIG2B) to a signal processing configuration 166 (e.g., of FIG. 1).

In the illustrated implementation, the first set of first sensing elements SET1SEN1 includes twelve first sensing elements SEN1 (i.e., including first sensing elements SEN1-A1 to SEN1-A12), and the second set of first sensing elements SET2SEN1 includes twelve first sensing elements SEN1 (i.e., including first sensing elements SEN1-B1 to SEN1-B12). For simplicity of the illustration, only the first two (i.e., A1-A2 and B1-B2) and last two (i.e., A11-A12 and B11-B12) sensing elements of each set are labeled, although the sensing elements (i.e., A3-A10 and B3-B10) will similarly be understood to correspond to the remaining sensing elements as shown. In the illustrated implementation, the first set of second sensing elements SET1SEN2 includes six second sensing elements SEN2 (i.e., including second sensing elements SEN2-A1 to SEN2-A6), and the second set of second sensing elements SET2SEN2 includes six second sensing elements SEN2 (i.e., including second sensing elements SEN2-B1 to SEN2-B6). For simplicity of the illustration, only the first two (i.e., A1-A2 and B1-B2) and last two (i.e., A5-A6 and B5-B6) sensing elements of each set are labeled, although the sensing elements (i.e., A3-A4 and B3-B4) will similarly be understood to correspond to the remaining sensing elements as shown.

It will be appreciated that in various implementations it is advantageous to configure the detector (e.g., in each of the first and second sensing element portions PRTSEN1 and PRTSEN2) to provide two or more sets of sensing elements at different spatial phase positions (e.g., to provide or otherwise correspond to quadrature signals, etc.), as will be understood by one of ordinary skill in the art. Thus, for example, the first set of first sensing elements SET1SEN1 and the second set of first sensing elements SET2SEN1 are at different spatial phase positions. Similarly, the first set of second sensing elements SET1SEN2 and the second set of second sensing elements SET2SEN2 are at different spatial phase positions. However, it should be appreciated that the configurations of sensing elements as described herein are intended to be exemplary only, and not limiting. As one example, individual sensing element loops may output individual signals to a corresponding signal processing configuration in some implementations, for example as disclosed in U.S. Pat. No. 9,958,294, which is hereby incorporated by reference in its entirety. More generally, various known sensing element configurations may be used in combination with the principles described herein, for use in combination with various scale pattern and signal processing schemes, etc.

In the illustrated implementation of the scale portion 170 and the scale pattern 180, the first signal modulating element pattern PATSME1 in the first scale element portion PRTSC1 in the first track portion TR1 includes a first half pattern portion FHPP1 and a second half pattern portion SHPP2, with each half pattern portion including a row of first signal modulating elements SME1. Similarly, the second signal modulating element pattern PATSME2 in the second scale element portion PRTSC2 in the second track portion TR2 includes a first half pattern portion FHPP2 and a second half pattern portion SHPP2, with each half pattern portion including a row of second signal modulating elements SME2.

In various implementations, the signal modulating elements SME1 and/or SME2 may comprise conductive plates (e.g., as formed by regions fabricated on a printed circuit board, or as formed by raised regions extending from a conductive substrate, or as fabricated on a glass substrate, or according to other fabrication methods, etc.). The scale pattern 180 is generally implemented on the scale portion 170. It will be appreciated that there is relative movement between the scale pattern 180 and the detector portion 167 (e.g., along an arc motion direction) during operation. The scale pattern 180 has spatial characteristics which change as a function of position, so as to provide position dependent detector signals arising in the sensing elements SEN1 and SEN2 of the sensing portion PRTSEN in the detector portion 167. In various implementations, the field generating portion PRTFGE and the sensing portion PRTSEN of the detector portion 167 may be formed according to a variety of alternative configurations to be used in combination with a variety of corresponding signal processing schemes, as will be understood by one skilled in the art.

In one specific illustrative example, the detector portion 167 may be arranged parallel with and facing the scale portion 170, and a front face of the detector portion 167 that faces the scale portion 170 may be separated from the scale portion 170 (and/or the scale pattern 180) by a gap distance (e.g., on the order of 0.1 mm-0.2 mm) along the z-axis direction. The front face of the detector portion 167 (e.g., including its constituent conductors) may be covered by an insulative coating.

It will be appreciated that various elements may reside on different fabrication layers located at different planes along the z-axis direction, as needed to provide various operating gaps and/or insulating layers, as will be apparent to one of ordinary skill in the art based on the described implementations and the incorporated references. Throughout the figures of this disclosure, it will be appreciated that the illustrated x-axis, y-axis and/or z-axis dimensions of one or more elements may be exaggerated for clarity, but it will be understood that they are not intended to contradict the various design principles and relationships described herein.

The transducer TDR includes a first transducer portion PRTTDR1 and a second transducer portion PRTTDR2. The first transducer portion PRTTDR1 includes the first sensing element portion PRTSEN1, the first field generating element portion PRTFGE1, and the first scale element portion PRTSC1. The second transducer portion PRTTDR2 includes the second sensing element portion PRTSEN2, the second field generating element portion PRTFGE2, and the second scale element portion PRTSC2. The first and second scale track portions TR1 and TR2 include the first transducer portion PRTTDR1 and the second transducer portion PRTTDR2, respectively. As described herein, operations of the first transducer portion PRTTDR1 of the first track portion TR1 produce detector signals SIG1A and SIG1B and operations of the second transducer portion PRTTDR2 of the second track portion TR2 produce detector signals SIG2A and SIG2B. Processing of the signals (e.g., by the signal processing configuration 166) enables an absolute relative position to be determined between the detector portion 167 and the scale portion 170.

The first transducer portion PRTTDR1 of the first track portion TR1 and the second transducer portion PRTTDR2 of the second track portion TR2 may be operated in accordance with first and second drive operations, respectively, which in various implementations may be performed simultaneously or with different timings. As part of a first drive operation, the first field generating element portion PRTFGE1 generates a changing magnetic flux in response to a coil drive signal (e.g., as provided from a signal processing configuration 166). The first sensing elements SEN1 of the first sensing element portion PRTSEN1 are configured to provide detector signals (e.g., SIG1A, SIG1B) which respond to a local effect on the changing magnetic flux provided by first signal modulating elements SME1 (e.g., including first signal modulating elements SME1 that are relatively adjacent or otherwise aligned with sensing elements SEN1 along the z-axis direction) of the first scale element portion PRTSC1. As part of a second drive operation, the second field generating element portion PRTFGE2 generates a changing magnetic flux in response to a coil drive signal (e.g., as provided from a signal processing configuration 166). The second sensing elements SEN2 of the second sensing element portion PRTSEN2 are configured to provide detector signals (e.g., SIG2A and SIG2B) which respond to a local effect on the changing magnetic flux provided by second signal modulating elements SME2 (e.g., including second signal modulating elements SME2 that are relatively adjacent or otherwise aligned with sensing elements SEN2 along the z-axis direction) of the second scale element portion PRTSC2.

A signal processing configuration (e.g., the signal processing configuration 166 of FIG. 1, etc.) may be configured to determine a position of the sensing portion PRTSEN (e.g., including the first and second sensing element portions PRTSEN1 and PRTSEN2) of the detector portion 167 relative to the scale portion 170 based on the detector signals input from the detector portion 167. For example, the first sensing element portion PRTSEN1 may provide detector signals SIG1A and SIG1B, and the second sensing element portion PRTSEN2 may provide detector signals SIG2A and SIG2B. In various implementations, the detector signals may also or alternatively be referenced as sensing signals. The signals from the detector portion 167 may be input to the signal processing configuration 166, and utilized for determining the measurement/position of the detector portion 167 relative to the scale portion 170. In general, the sensing element portions and field generating element portions may at least in part operate according to known principles (e.g., for inductive encoders), such as those described above in relation to FIG. 11, and such as described at least in part in U.S. Pat. Nos. 5,841,274; 5,886,519; 5,894,678; 6,124,708; 10,520,335; 10,612,943 and 10,775,199, each of which is hereby incorporated herein by reference in its entirety.

Figure 4:
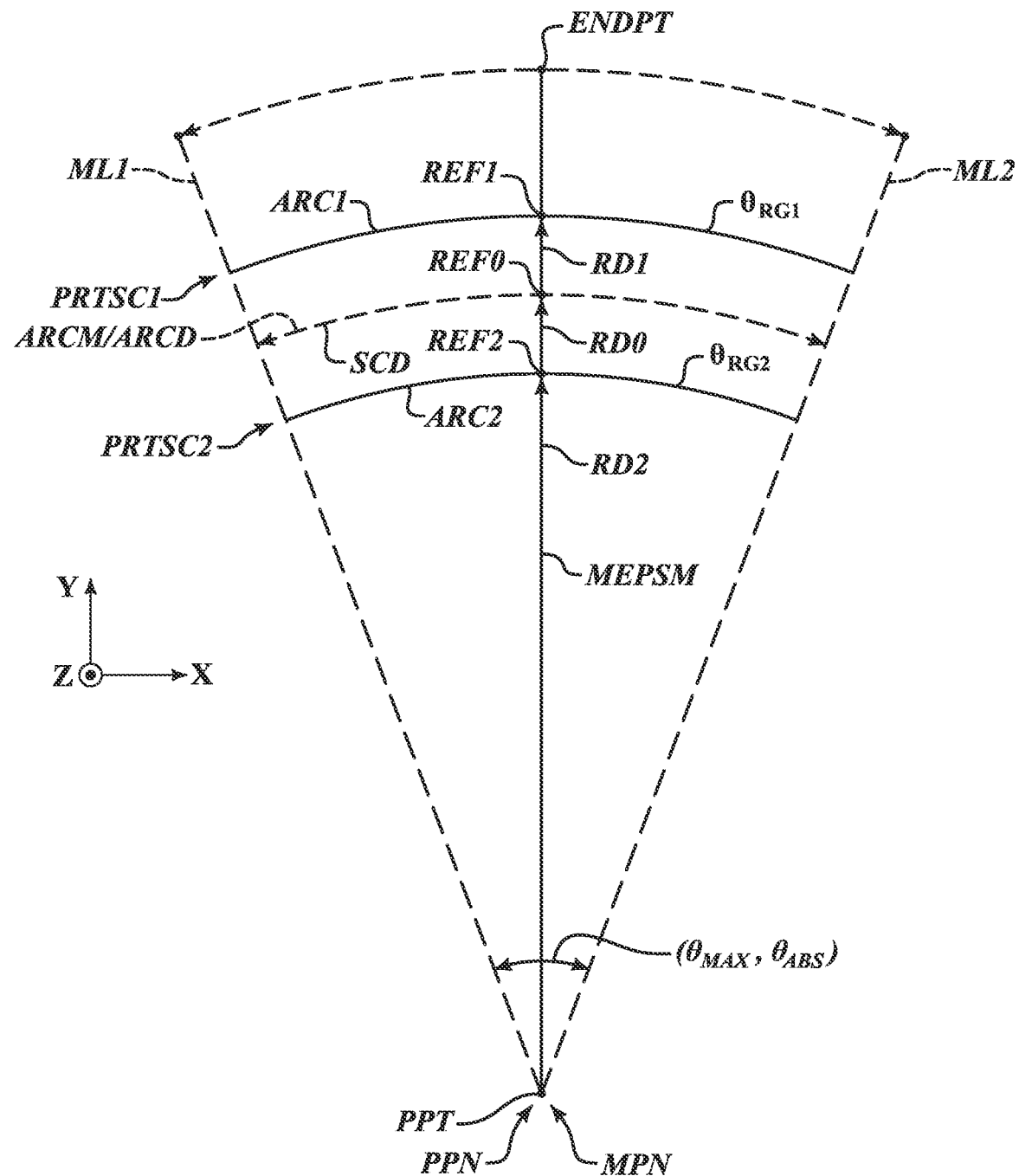
FIG. 4 is a diagram illustrating certain dimensions and features of the measuring instrument of FIG. 2 and the transducer of FIG. 3.

FIG. 4 is a diagram illustrating certain dimensions and aspects of the measuring instrument 100 including the transducer TDR. In FIG. 4, certain elements (e.g., the first scale element portion PRTSC1, the second scale element portion PRTSC2, the movable encoder portion support member MEPSM, etc.) are each represented as lines (e.g., for which the positions may correspond to those of central lines or other representations of the corresponding components). Representations of the pivot portion PPN including the pivot point PPT, as part of the moveable portion MPN, are illustrated (e.g., the contact portion CPN is not illustrated in FIG. 4, but will be understood to be located beneath the pivot portion PPN, such as illustrated in FIG. 2).

The moveable encoder portion support member MEPSM is illustrated as rotating around the pivot portion PPN in an arc motion in an arc motion direction. The support member MEPSM may move between first and second movement limit indicators ML1 and ML2, as part of moving over a maximum angular movement range $\theta_{MAX}$. In certain implementations, the maximum angular movement range $\theta_{MAX}$ may correspond to the absolute angular measurement range $\theta_{ABS}$. In various alternative implementations, the absolute angular measurement range $\theta_{ABS}$ and the maximum angular movement range $\theta_{MAX}$ may be different. As described above with respect to FIG. 2, an endpoint ENDPT corresponds to an end of the moveable encoder portion support member MEPSM, and also corresponds to an end of the moveable portion MPN, and correspondingly moves in the arc motion along the arc motion direction.

In some implementations, the first and second scale element portions PRTSC1 and PRTSC2 of the scale portion 170 may be attached to the moveable encoder portion support member MEPSM (e.g., in implementations where the moveable encoder portion MEP includes the scale portion 170) in which case the first and second scale element portions PRTSC1 and PRTSC2 will move in accordance with the arc motion ARCM along the arc motion direction ARCD, relative to the detector portion 167. Alternatively, if the moveable encoder portion MEP includes the detector portion 167, then the detector portion 167 may be attached to the moveable encoder portion support member MEPSM, and will correspondingly move in accordance with the arc motion ARCM in the arc motion direction ARCD, relative to the first and second scale element portions PRTSC1 and PRTSC2 of the scale portion 170.

As shown in FIGS. 3 and 4, the first scale element portion PRTSC1 and/or the first sensing element portion PRTSEN1 has a first central reference point REF1 (e.g., located at a central x and/or y-axis location, such as at a centerline, of the first scale element portion PRTSC1 and/or of the first sensing element portion PRTSEN1), which is located at a first radius RD1 from the pivot portion PPN (e.g., from the pivot point PPT of the pivot portion PPN). The second scale element portion PRTSC2 and/or the second sensing element portion PRTSEN2 has a second central reference point REF2 (e.g., located at a central x and/or y-axis location, such as at a centerline, of the second scale element portion PRTSC2 and/or of the second sensing element portion PRTSEN2) that is located at a second radius RD2 from the pivot portion PPN (e.g., from the pivot point PPT of the pivot portion PPN). In addition, a central reference point REF0 is indicated (e.g., such as may be located at a midpoint between the central reference points REF1 and REF2 and/or between the first and second scale element portions PRTSC1 and PRTSC2, etc.) and for which the central reference point REF0 is located at a radius RD0 from the pivot portion PPN (e.g., from the pivot point PPT of the pivot portion PPN).

As illustrated in FIGS. 3 and 4, the first and second scale element portions PRTSC1 and PRTSC2 of the first and second track portions TR1 and TR2 are arc-shaped and are parallel to each other (e.g., form concentric arcs). The second track portion TR2 is closer to the pivot portion PPN than the first track portion TR1 (e.g., such that a radius RD2 of a second central reference point REF2 of the second track portion TR2 is smaller than a radius RD1 of a first central reference point REF1 of the first track portion TR1). As illustrated in FIG. 3, the first signal modulating scale elements SME1 are disposed along the first scale element portion PRTSC1 according to a first signal modulating element angular spatial step $\theta_{WSME1}$ and the second signal modulating scale elements SME2 are disposed along the second scale element portion PRTSC2 according to a second signal modulating element angular spatial step $\theta_{WSME2}$ that is different than the first signal modulating element angular spatial step $\theta_{WSME1}$. As will be described in more detail below, in certain implementations, at least one of the first or second signal modulating element angular spatial steps $\theta_{WSME1}$ or $\theta_{WSME2}$ does not divide evenly into 360 degrees.

As illustrated in FIG. 4, the first scale element portion PRTSC1 has a first angular range $\theta_{RG1}$ and a corresponding arc length ARC1, and the second scale element portion PRTSC2 has a second angular range $\theta_{RG2}$ and a corresponding arc length ARC2. The angular ranges $\theta_{RG1}$ and $\theta_{RG2}$ are indicated as being nominally equal, and in the example of FIGS. 3 and 4 are indicated as being nominally equal to the absolute angular measurement range $\theta_{ABS}$ and to the maximum angular movement range $\theta_{MAX}$. As will be described in more detail below, the first and second signal modulating element angular spatial steps $\theta_{WSME1}$ and $\theta_{WSME2}$ may be related to the absolute angular measurement range $\theta_{ABS}$. The arrangement of the first scale element portion PRTSC1 with the first angular range $\theta_{RG1}$ and arc length ARC1 and the second scale element portion PRTSC2 with the second angular range $\theta_{RG2}$ and arc length ARC2 enables operations which in combination achieve the absolute angular measurement range $\theta_{ABS}$.

A scale direction SCD (e.g., which in the implementation of FIGS. 3 and 4 is in an arc direction) is indicated (e.g., along which the signal modulating elements SME of the first and second scale element portions PRTSC1 and PRTSC2 may be arranged, such as in accordance with the respective angular spatial steps $\theta_{WSME1}$ and $\theta_{WSME2}$, such as illustrated in FIG. 3). In various implementations, the first scale element portion PRTSC1 (e.g., which is arc-shaped) is arranged at the first radius RD1 from the pivot portion PPN and the second scale element portion PRTSC2 (e.g., which is arc-shaped) is arranged at the second radius RD2 from the pivot portion PPN, for which the first radius RD1 is larger than the second radius RD2. In various implementations, the first and second scale element portions PRTSC1 and PRTSC2 define a corresponding absolute angular measurement range $\theta_{ABS}$ (e.g., wherein each relative position between the detector portion 167 and the scale portion 170 within the absolute angular measurement range $\theta_{ABS}$ produces a unique combination of detector signals from the detector portion 167).

In various implementations, the ratio of the signal modulating element angular spatial steps $\theta_{WSME2}/\theta_{WSME1}$ can be expressed in accordance with being equal to at least one of the following EQUATIONS 1-4, for which n and m are positive integers in each of the equations. In certain implementations, m is a positive integer that is at least 2 (e.g., for which in certain implementations m may be 2, 3, 4, or 5, etc.). It is noted that such relationships for a configuration in which m is 2 or larger corresponds to a relatively large difference between the signal modulating element angular spatial steps $\theta_{WSME1}$ and $\theta_{WSME2}$ (e.g., where the angular spatial step $\theta_{WSME2}$ is close to being an integer multiple (e.g., m=2 or larger) of the angular spatial step $\theta_{WSME1}$). In implementations where m=1, the equations are noted to be reducible to a simpler form (e.g., in which the nm factor reduces to n). In relation to these equations, it is noted that one technique for encoding an absolute angular measurement range $\theta_{ABS}$ into an encoder utilizing arc motion is to use two scale element portions with signal modulating element angular spatial steps that satisfy certain relationships. For example, the following equations illustrate certain relationships that the signal modulating element angular spatial steps $\theta_{WSME1}$ and $\theta_{WSME2}$ of the scale element portions PRTSC1 and PRTSC2 of the track portions TR1 and TR2 may satisfy.

$$\theta_{WSME2}/\theta_{WSME1} = (nm/(n-1)) \quad \text{(Eq. 1)}$$

$$\theta_{WSME2}/\theta_{WSME1} = (nm/(n+1)) \quad \text{(Eq. 2)}$$

$$\theta_{WSME2}/\theta_{WSME1} = ((nm+1)/n) \quad \text{(Eq. 3)}$$

$$\theta_{WSME2}/\theta_{WSME1} = ((nm-1)/n) \quad \text{(Eq. 4)}$$

In various implementations, the absolute angular measurement range $\theta_{ABS}$ is equal to one of $n\theta_{WSME1}$ or $n\theta_{WSME2}$. For example, in certain implementations, a configuration corresponding to EQUATION 1 or 2 may meet an additional condition where the absolute angular measurement range $\theta_{ABS}=n\theta_{WSME1}$, and a configuration corresponding to EQUATION 3 or 4 may meet an additional condition where the absolute angular measurement range $\theta_{ABS}=n\theta_{WSME2}$. In various implementations, a configuration corresponding to EQUATION 1 may meet an additional condition where the absolute angular measurement range $\theta_{ABS}=((n-1)/m)\theta_{WSME2}$, a configuration corresponding to EQUATION 2 may meet an additional condition where the absolute angular measurement range $\theta_{ABS}=((n+1)/m)\theta_{WSME2}$, a configuration corresponding to EQUATION 3 may meet an additional condition where the absolute angular measurement range $\theta_{ABS}=(nm+1)\theta_{WSME1}$, and a configuration corresponding to EQUATION 4 may meet an additional condition where the absolute angular measurement range $\theta_{ABS}=(nm-1)\theta_{WSME1}$. In accordance with such relationships, it will be appreciated that a method for choosing the two signal modulating element angular spatial steps is to set an integer number n of angular spatial steps (e.g., for either $\theta_{WSME1}$ or $\theta_{WSME2}$) to be included in the absolute angular measurement range $\theta_{ABS}$, and for which the other signal modulating element angular spatial step (e.g., either $\theta_{WSME2}$ or $\theta_{WSME1}$) may be determined according to a relationship such as that indicated above.

In various implementations, the first scale element portion PRTSC1 has an arc length ARC1 and is arranged at a first radius RD1 from the pivot portion PPN, and the second scale element portion PRTSC2 has an arc length ARC2 and is arranged at a second radius RD2 from the pivot portion PPN (e.g., as indicated in FIG. 4), for which ARC2/ARC1=RD2/RD1. In various implementations, the second signal modulating element angular spatial step $\theta_{WSME2}$ is larger than first signal modulating element angular spatial step $\theta_{WSME1}$ (e.g., in configurations in which m is 2 or larger then the angular spatial step $\theta_{WSME2}$ may be close to being a corresponding integer multiple of the angular spatial step $\theta_{WSME1}$).

As noted above, the first signal modulating element pattern PATSME1 in the first scale element portion PRTSC1 in the first track portion TR1 includes a first half pattern portion FHPP1 and a second half pattern portion SHPP1, with each half pattern portion including a row of first signal modulating elements SME1. In each scale row the first signal modulating elements SME1 are disposed (e.g., spaced/spatially positioned) according to a first signal modulating element angular spatial step $\theta_{WSME1}$. For the two adjacent scale rows in the half pattern portions, the spatial phase of the scale row in the second half pattern portion is offset from the spatial phase of the adjacent scale row in the first half pattern portion by ½ of the first signal modulating element angular spatial step $\theta_{WSME1}$. Thus, in this example, the signal modulating element spatial phase offset is ½ of the first signal modulating element angular spatial step $\theta_{WSME1}$ (e.g., which may correspond to a 180 degree spatial phase shift/difference between the adjacent scale rows).

As noted above, the second signal modulating element pattern PATSME2 in the second scale element portion PRTSC2 in the second track portion TR2 includes a first half pattern portion FHPP2 and a second half pattern portion SHPP2, with each half pattern portion including a row of second signal modulating elements SME2. In each scale row the second signal modulating elements SME2 are disposed (e.g., spaced/spatially positioned) according to a second signal modulating element angular spatial step $\theta_{WSME2}$. For the two adjacent scale rows in the half pattern portions, the spatial phase of the scale row in the second half pattern portion is offset from the spatial phase of the adjacent scale row in the first half pattern portion by ½ of the second signal modulating element angular spatial step $\theta_{WSME2}$. Thus, in this example, the signal modulating element spatial phase offset is ½ of the second signal modulating element angular spatial step $\theta_{WSME2}$ (e.g., which may correspond to a 180 degree spatial phase shift/difference between the adjacent scale rows).

In various implementations, in the first sensing element portion PRTSEN1, the first and second sets of first sensing elements SET1SEN1 and SET2SEN1 are at different angular spatial phase positions, as separated by a first sensing element angular spatial phase offset. In various implementations, a first sensing element angular spatial step $\theta_{WSEN1}$ of the first sensing element portion PRTSEN1 (e.g., of each of the sets of first sensing elements SET1SEN1 and SET2SEN1) may correspond to (e.g., be equal to) the first signal modulating element angular spatial step $\theta_{WSME1}$ of the first scale element portion PRTSC1. In various implementations, the first sensing element angular spatial phase offset may be equal to approximately ¼ of the first sensing element angular spatial step $\theta_{WSEN1}$ (e.g., in accordance with a quadrature configuration, as will be understood by one skilled in the art).

Similarly, in various implementations, in the second sensing element portion PRTSEN2, the first and second sets of second sensing elements SET1SEN2 and SET2SEN2 are at different angular spatial phase positions, as separated by a second sensing element angular spatial phase offset. In various implementations, a second sensing element angular spatial step $\theta_{WSEN2}$ of the second sensing element portion PRTSEN2 (e.g., of each of the sets of second sensing elements SET1SEN2 and SET2SEN2) may correspond to (e.g., be equal to) the second signal modulating element angular spatial step $\theta_{WSME2}$ of the second scale element portion PRTSC2. In various implementations, the second sensing element angular spatial phase offset may be equal to approximately ¼ of the second sensing element angular spatial step $\theta_{WSEN2}$ (e.g., in accordance with a quadrature configuration, as will be understood by one skilled in the art).

Figure 5:
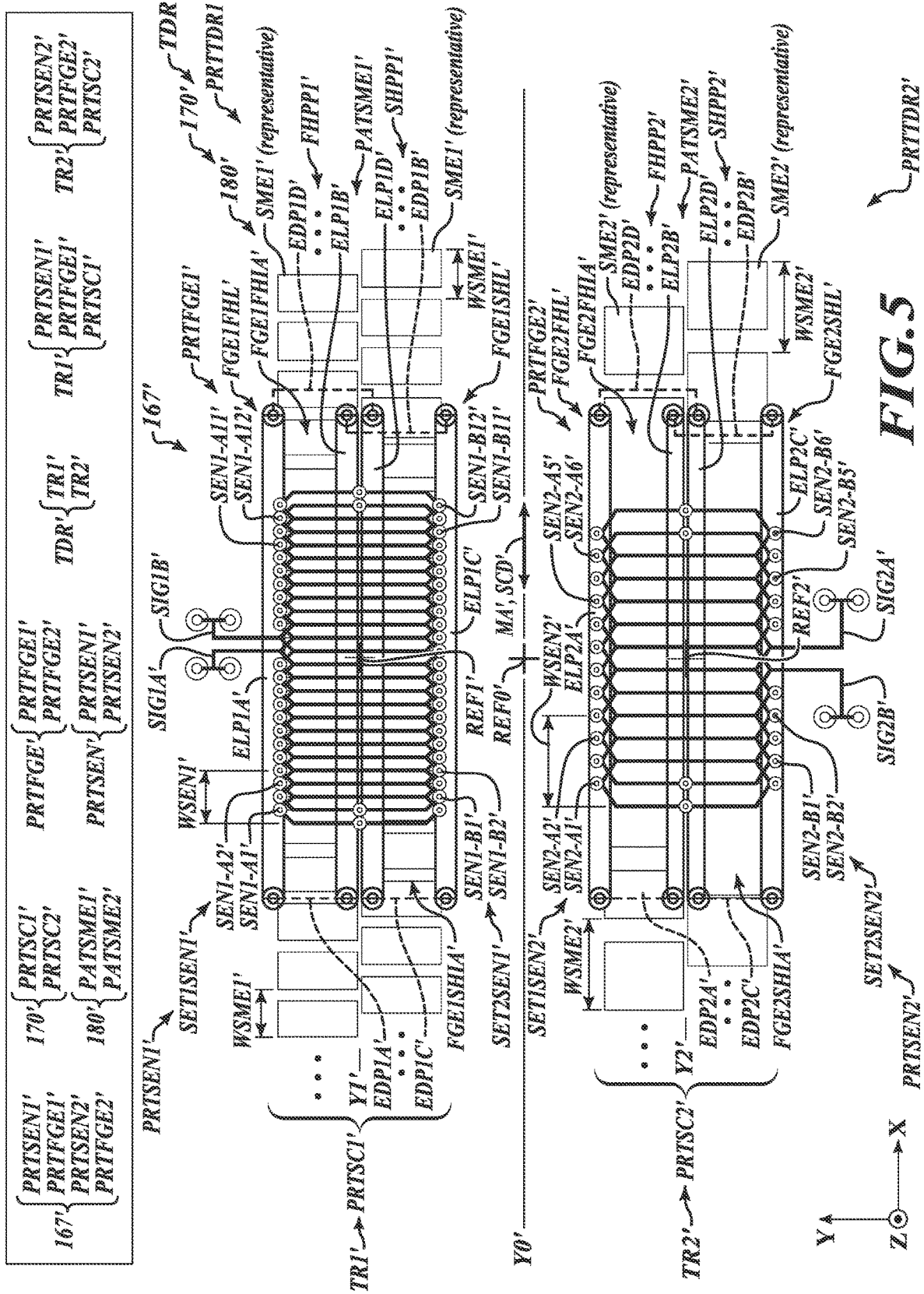
FIG. 5 is a diagram of an implementation of a portion of a transducer configured to be utilized with linear motion between a detector portion and a scale portion, presented as background information that is relevant to various principles described herein.
Figure 6:
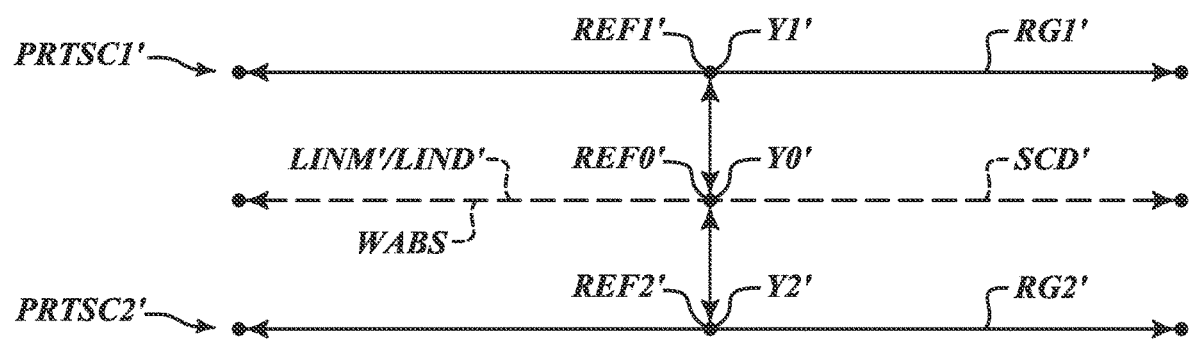
FIG. 6 is a diagram illustrating certain dimensions and features of the transducer of FIG. 5.
Figure 6:
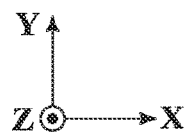

FIG. 5 is a diagram of an implementation of a portion of a transducer TDR' configured to be utilized with linear motion LINM' between a detector portion 167' and a scale portion 170', presented as background information that is relevant to various principles described herein. FIG. 6 is a diagram illustrating certain dimensions and features of the transducer of FIG. 5. In various implementations, the transducer TDR' of FIGS. 5 and 6 (e.g., which is configured to be utilized in a measuring instrument with linear motion) may have similarities to the transducer TDR of FIGS. 3 and 4 (e.g., which is configured to be utilized in a measuring instrument with arc motion), such that in certain implementations a type of conversion may be performed to change the design of one to the design of the other, as will be described in more detail below.

As such, each of the components of the transducer TDR will be understood to have a corresponding component in the transducer TDR'. In general, the corresponding components have mostly identical reference numbers or symbols, except with prime designations (e.g., 167', 170', etc.) in the transducer TDR'. Each of the corresponding components will be understood to have analogous design and/or similar function, except in relation to the overall function of the transducer TDR' (e.g., as configured to be utilized in a measuring instrument with linear motion), as compared to the overall function of the transducer TDR (e.g., as configured to be utilized in a measuring instrument with arc motion). As such, the components of the transducer TDR' will be understood by one skilled in the art based on the corresponding components of the transducer TDR as described above, and based on the descriptions in the incorporated references of other transducers configured to be utilized with linear motion. As such, a complete description of the components of the transducer TDR' will not be provided herein, although for reference a brief description will be provided below.

Briefly, the transducer TDR' of FIGS. 5 and 6 includes a detector portion 167' and a scale portion 170'. The scale portion 170' extends along a scale direction SCD', the scale portion 170' comprising a first scale element portion PRTSC1' comprising first signal modulating scale elements SME1', and a second scale element portion PRTSC2' comprising second signal modulating scale elements SME2'. A periodic scale pattern 180' includes first and second signal modulating element patterns PATSME1' and PATSME2'. The detector portion 167' is configured to be proximate to the scale portion 170' with relative movement between the detector portion 167' and the scale portion 170' resulting from linear motion (e.g., of a measuring instrument in which the transducer TDR' is included).

The detector portion 167' comprises a field generating portion PRTFGE' and a sensing portion PRTSEN'. The field generating portion PRTFGE' is configured to generate changing magnetic flux in response to drive signals. The field generating portion PRTFGE' includes first and second field generating element portions PRTFGE1' and PRTFGE2', which include elongated portions ELP1A'-ELP1D' and ELP2A'-ELP2D' and end portions EDP1A'-EDP1D' and EDP2A'-EDP2D', which form the respective first and second half loops FGE1FHL', FGE1SHL', FGE2FHL' and FGE2SHL', with the respective interior areas FGE1FHIA', FGE1SHIA', FGE2FHIA' and FGE2SHIA'.

The sensing portion PRTSEN' comprises a first sensing element portion PRTSEN1' and a second sensing element portion PRTSEN2'. The first sensing element portion PRTSEN1' comprises first and second set of first sensing elements SET1SEN1' and SET2SEN1' (e.g., which include respective sensing elements SEN1-A1' to SEN1-A12' and SEN1-B1' to SEN1-B12') and is arranged in a first track portion TR1' with the first scale element portion PRTSC1'. The second sensing element portion PRTSEN2' comprises first and second sets of second sensing elements SET1SEN2' and SET2SEN2' (e.g., which include respective sensing elements SEN2-A1' to SEN2-A6' and SEN2-B1' to SEN2-B6') and is arranged in a second track portion TR2' with the second scale element portion PRTSC2'. The portions PRTFGE1', PRTSEN1' and PRTSC1' are included in a first transducer portion PRTTDR1' (e.g., as included in the first track portion TR1'), and the portions PRTFGE2', PRTSEN2' and PRTSC2' are included in a second transducer portion PRTTDR2' (e.g., as included in the second track portion TR2').

The first and second scale element portions PRTSC1' and PRTSC2' of the first and second track portions TR1' and TR2' are linear and parallel to each other. The first signal modulating scale elements SME1' are disposed along the first scale element portion PRTSC1' according to a first signal modulating element linear spatial step WSME1' and the second signal modulating scale elements SME2' are disposed along the second scale element portion PRTSC2' according to a second signal modulating element linear spatial step WSME2' that is different than the first signal modulating element linear spatial step WSME1'.

The first sensing element portion PRTSEN1' and the second sensing element portion PRTSEN2' of the detector portion 167' produce the respective detector signals SIG1A' and SIG1B', and SIG2A' and SIG2B'. A signal processing configuration may be configured to determine a position of the detector portion 167' relative to the scale portion 170' based on the detector signals input from the detector portion 167'.

FIG. 6 is a diagram illustrating certain dimensions and aspects of the transducer TDR'. In FIG. 6, the first scale element portion PRTSC1' and the second scale element portion PRTSC2' are each represented as lines (e.g., for which the positions may correspond to those of central lines or other representations of the corresponding components). In the implementation of FIGS. 5 and 6, the transducer TDR' is configured to operate with relative linear motion LINM' along a linear motion direction LIND', as corresponding to relative movement between the detector portion 167' and the scale portion 170' (e.g., with the scale portion 170' including the first scale element portion PRTSC1' and the second scale element portion PRTSC2').

As shown in FIG. 6, the first scale element portion PRTSC1' has a first central reference point REF1', which is at a corresponding y-axis coordinate Y1'. The second scale element portion PRTSC2' has a second central reference point REF2', and is at corresponding y-axis coordinate Y2'. In addition, a reference point REF0' is indicated, which is at a corresponding y-axis coordinate Y0'. In various implementations, the y-axis coordinates Y1' and Y2' may be referenced in relation to the y-axis coordinate Y0' (e.g., in accordance with being at a particular y-axis distance above or below the y-axis coordinate Y0'). In the particular example of FIG. 6, the reference point REF0' and the y-axis coordinate Y0' are located at a midpoint between the central reference points REF1' and REF2', which correspondingly is at a midpoint between the first and second scale element portions PRTSC1' and PRTSC2'. In one particular specific numerical example, the y-axis coordinates Y0'=0, Y1'=+4 and Y2'=−4. As will be described in more detail below, in certain alternative implementations the y-axis coordinate Y0' of the reference point REF0' may be designated/selected to be at other locations (e.g., at other positioning between Y1' and Y2', or above Y1' and Y2', or below Y1' and Y2').

As illustrated in FIG. 6, the first scale element portion PRTSC1' has a first linear range RG1', and the second scale element portion PRTSC2' has a second linear range RG2'. In such a configuration, the track ranges RG1' and RG2' may generally be the same, and may correspond to an absolute linear measurement range WABS' (e.g., RG1'=RG2'=WABS'). It will be appreciated that in various implementations the ranges may be regarded as mathematic constructs, and may not correspond to the exact physical scale lengths. The arrangement of the first scale element portion PRTSC1' with the first linear range RG1' and the second scale element portion PRTSC2' with the second linear range RG2' enables operations which in combination achieve the absolute linear measurement range WABS. A scale direction SCD' (e.g., which in the implementation of FIGS. 5 and 6 may correspond to the x-axis direction) is indicated (e.g., along which the signal modulating elements SME' of the first and second scale element portions PRTSC1' and PRTSC2' may be arranged, such as in accordance with the respective linear spatial steps WSME1' and WSME2', such as illustrated in FIG. 5).

In various implementations, the ratio of the signal modulating element linear spatial steps WSME2'/WSME1' can be expressed in accordance with being equal to at least one of the following EQUATIONS 5-8, for which n and m are positive integers in each of the equations (e.g., and for which the EQUATIONS 5-8 are noted to have certain similarities to the EQUATIONS 1-4). In certain implementations, m is a positive integer that is at least 2 (e.g., for which in certain implementations m may be 2, 3, 4, or 5, etc.). It is noted that such relationships for a configuration in which m is 2 or larger corresponds to a relatively large difference between the signal modulating element linear spatial steps WSME1' and WSME2'. In implementations where m=1, the equations are noted to be reducible to a simpler form (e.g., in which the nm factor reduces to n). In relation to these equations, it is noted that one technique for encoding an absolute linear measurement range WABS' into an encoder utilizing linear motion is to use two scale element portions with signal modulating element linear spatial steps that satisfy certain relationships. For example, the following equations illustrate certain relationships that the signal modulating element linear spatial steps WSME1' and WSME2' of the scale element portions PRTSC1' and PRTSC2' of the track portions TR1' and TR2' may satisfy.

$$WSME2'/WSME1' = (nm/(n-1)) \quad \text{(Eq. 5)}$$

$$WSME2'/WSME1' = (nm/(n+1)) \quad \text{(Eq. 6)}$$

$$WSME2'/WSME1' = ((nm+1)/n) \quad \text{(Eq. 7)}$$

$$WSME2'/WSME1' = ((nm-1)/n) \quad \text{(Eq. 8)}$$

As indicated in FIG. 6, in various implementations the first track portion TR1' has a first track range RG1' and the second track portion TR2' has a second track range RG2'. As noted above, in such a configuration, the track ranges RG1' and RG2' may generally be approximately equivalent (e.g., approximately the same), and may correspond to an absolute linear measurement range WABS' (e.g., RG1'=RG2'=WABS'). In various implementations, either the absolute linear measurement range WABS'=nWSME1' or the absolute linear measurement range WABS'=nWSME2'. For example, in certain implementations, a configuration corresponding to EQUATION 5 or 6 may meet an additional condition where the absolute linear measurement range WABS'=nWSME1', and a configuration corresponding to EQUATION 7 or 8 may meet an additional condition where the absolute linear measurement range WABS'=nWSME2'.

In various implementations, a configuration corresponding to EQUATION 5 may meet an additional condition where the absolute linear measurement range WABS'=((n−1)/m)WSME2', a configuration corresponding to EQUATION 6 may meet an additional condition where the absolute linear measurement range WABS'=((n+1)/m)WSME2', a configuration corresponding to EQUATION 7 may meet an additional condition where the absolute linear measurement range WABS'=(nm+1)WSME1', and a configuration corresponding to EQUATION 8 may meet an additional condition where the absolute linear measurement range WABS'=(nm−1)WSME1'.

In accordance with such relationships, it will be appreciated that a method for choosing the two signal modulating element linear spatial steps is to set an integer number n of linear spatial steps (e.g., for either WSME1' or WSME2') to be included in the absolute linear measurement range WABS', and for which the other signal modulating element linear spatial step (e.g., either WSME2' or WSME1') may be determined according to a relationship such as that indicated above. In various implementations, the second signal modulating element linear spatial step WSME2' is larger than the first signal modulating element linear spatial step WSME1' (e.g., in configurations in which m is 2 or larger, then the second signal modulating element linear spatial step WSME2' may be close to being a corresponding integer multiple of the first signal modulating element linear spatial step WSME1').

As noted above, the transducer TDR' of FIGS. 5 and 6 (e.g., which is configured to be utilized in a measuring instrument with linear motion) may have similarities to the transducer TDR of FIGS. 3 and 4 (e.g., which is configured to be utilized in a measuring instrument with arc motion), such that in certain implementations a type of conversion may be performed to change the design of one to the design of the other. To help illustrate the principles of such a conversion and in relation to the following EQUATIONS 9 and 10, one specific numerical example in relation to the transducer TDR' is as follows.

In one implementation, the y-axis coordinate Y0' of the reference point REF0' may be designated as having a value of 0 mm (e.g., along the y-axis). The y-axis coordinate Y1' of the reference point REF1' may be designated as having a value of +4 mm (e.g., along the y-axis), and the y-axis coordinate Y2' of the reference point REF2' may be designated as having a value of −4 mm (e.g., along the y-axis), for which as noted above these values may be expressed in terms of their relative relationships. The linear spatial step WSME1' may be designated as having a value of 1.2 mm and the linear spatial step WSME2' may be designed as having a value of 2.5 mm.

In relation to EQUATION 5, if n=25 and m=2, then WSME2'/WSME1'=(nm/(n−1))=50/24=2.5 mm/1.2 mm. In addition, with WABS'=nWSME1'=25(1.2 mm)=30 mm and with WABS'=((n−1)/m)WSME2'=(24/2)2.5 mm=30 mm, this corresponds to RG1'=RG2'=WABS'=30 mm, for which within the absolute linear measurement range WABS' there are 25 WSME1' (corresponding to 25 SME1') and 12 WSME2' (corresponding to 12 SME2'). It is noted that the relationships of this configuration may alternatively be written in terms of EQUATION 7, where if n=12 and m=2, then WSME2'/WSME1'=((nm+1)/n)=(24+1)/12=2.5 mm/1.2 mm. In addition, with WABS'=nWSME2'=12(2.5 mm)=30 mm and with WABS'=(nm+1)WSME1'=(24+1)1.2 mm=30 mm, this corresponds to RG2'=RG1'=WABS'=30 mm, for which within the absolute linear measurement range WABS' there are 25 WSME1' (corresponding to 25 SME1') and 12 WSME2' (corresponding to 12 SME2').

As another example, it is noted that in an alternative arrangement in which the absolute linear measurement range WABS' (remaining at 30 mm) included 25 WSME (corresponding to 25 SME1'), where WSME1' remains at 1.2 mm, and included 13 WSME2' (corresponding to 13 SME2'), with WSME2'=30 mm/13=2.31 mm, the relationships could be expressed in terms of EQUATIONS 6 or 8. More specifically, with n=25 and m=2, in accordance with EQUATION 6, WSME2'/WSME1'=(nm/(n+1))=50/26=2.31 mm/1.20 mm. With WABS'=nWSME1'=((n+1)/m) WSME2', within the absolute linear measurement range there are 25 WSME1' (corresponding to 25 SME1') and 13 WSME2' (corresponding to 13 SME2'). Alternatively, with n=13 and m=2, in accordance with EQUATION 8, WSME2"/WSME1"=((nm−1)/n)=25/13=2.31 mm/1.20 mm. With WABS'=nWSME2'=(nm−1)WSME1', within the absolute linear measurement range there are 13 WSME2' (corresponding to 13 SME2') and 25 WSME1' (corresponding to 25 SME1').

The following relationships indicate one way in which a conversion may be performed from the transducer TDR' to the transducer TDR (and for which it will be appreciated that such a conversion may also be performed in reverse with the relationships reversed from the transducer TDR to the transducer TDR'). As an initial step for such a conversion, a desired radius of the y-axis coordinate Y0' of the reference point REF0' (of FIG. 6) may be selected/determined. In one specific example, the radius of the y-axis coordinate Y0' of the reference point REF0' may be the radius RD0 (e.g., as indicated in FIG. 4).

Once the radius RD0 of the y-axis coordinate Y0' of the reference point REF0' is selected/determined, the following equations 9 and 10 indicate how the signal modulating element linear spatial steps WSME1' and WSME2' of the transducer TDR' (of FIGS. 5 and 6) may be converted to the signal modulating element angular spatial steps $\theta_{WSME1}$ and $\theta_{WSME1}$ of the transducer TDR (of FIGS. 3 and 4).

$$\theta_{WSME1} = WSME1' / RD0 \quad \text{(Eq. 9)}$$

$$\theta_{WSME2} = WSME2' / RD0 \quad \text{(Eq. 10)}$$

In addition, a process may be performed to transform every coordinate of the layout of the transducer TDR' to become the layout of the transducer TDR (e.g., as illustrated by a comparison of the transducer TDR of FIG. 3 to the transducer TDR' of FIG. 5). One representation of technique for performing such a transformation for every coordinate is as follows:

$$\begin{pmatrix} x \\ y \end{pmatrix} = \begin{pmatrix} (RD0 + y' - Y0')\sin\left(\dfrac{x'}{RD0}\right) \\ (RD0 + y' - Y0')\cos\left(\dfrac{x'}{RD0}\right) - RD0 \end{pmatrix} \quad \text{(Eq. 11)}$$

Such conversions (e.g., in accordance with EQUATIONS 9-11) will be further understood based on the following specific numerical example (e.g., which includes the example values described above for the transducer TDR').

In one implementation, if the radius RD0=40 mm, then in accordance with EQUATION 9, $\theta_{WSME1}$=WSME1'/RD0=1.2 mm/40 mm=0.03 radians=approximately 1.718873 degrees. In accordance with EQUATION 10, $\theta_{WSME2}$=WSME2'/RD0=2.5 mm/40 mm=0.0625 radians=approximately 3.580986 degrees. In various implementations $\theta_{WSEN1}$=$\theta_{WSME1}$ and $\theta_{WSEN2}$=$\theta_{WSME2}$, for which the dimensions of the sensing elements SEN1 and SEN2 in the transducer TDR as compared to the transducer TDR' are also indicated as having been correspondingly converted. In various implementations, the lengths of the elongated portions ELP of the field generating element portions PRTFGE1 and PRTFGE2 in the transducer TDR as compared to the transducer TDR' may also be correspondingly converted (e.g., by similar proportional amounts as the conversions for the respective WSME's), such as illustrated in FIG. 3.

In relation to the above values and in accordance with EQUATION 1, $\theta_{WSME2}$/$\theta_{WSME1}$=(nm/(n−1))=(50/24)=3.58 degrees/1.72 degrees. In addition, in various implementations $\theta_{ABS}$ can be determined in accordance with $\theta_{ABS}$=n$\theta_{WSME1}$=25(1.72 degrees)=43 degrees and with $\theta_{ABS}$=((n−1)/m)$\theta_{WSME2}$=((25−1)/2)(3.58 degrees)=43 degrees. In accordance with these relationships, within the absolute angular measurement range $\theta_{ABS}$ there are 25 $\theta_{WSME1}$ (corresponding to 25 SME1) and 12 $\theta_{WSME2}$ (corresponding to 12 SME2). It is noted that the relationships of this configuration may alternatively be written in terms of EQUATION 3, where if n=12 and m=2, then $\theta_{WSME2}$/$\theta_{WSME1}$=((nm+1)/n)=25/12=3.58 degrees/1.72 degrees. In addition, $\theta_{ABS}$=n$\theta_{WSME2}$=12(3.58 degrees)=43 degrees and $\theta_{ABS}$=(nm+1)$\theta_{WSME1}$=(24+1)1.72 degrees=43 degrees.

As another example, it is noted that in an alternative arrangement in which the absolute angular measurement range $\theta_{ABS}$ (remaining at 43 degrees) included 25 $\theta_{WSME1}$ (corresponding to 25 SME1), where $\theta_{WSME1}$ remains at 1.72 degrees, and includes 13 $\theta_{WSME2}$ (corresponding to 13 SME2), with $\theta_{WSME2}$=43 degrees/13=3.31 degrees, the relationships could be expressed in terms of EQUATIONS 2 or 4. More specifically, with n=25 and m=2, in accordance with EQUATION 2, $\theta_{WSME2}$/$\theta_{WSME1}$=(nm/(n+1))=50/26=3.31 degrees/1.72 degrees. With $\theta_{ABS}$=n$\theta_{WSME1}$=((n+1)/m) $\theta_{WSME2}$, within the absolute angular measurement range there are 25 $\theta_{WSME1}$ (corresponding to 25 SME1) and 13 $\theta_{WSME2}$ (corresponding to 13 SME2). Alternatively, with n=13 and m=2, in accordance with EQUATION 4, $\theta_{WSME2}$/$\theta_{WSME1}$=((nm−1)/n)=25/13=3.31 degrees/1.72 degrees. With $\theta_{ABS}$=n$\theta_{WSME2}$=(nm−1)$\theta_{WSME1}$, within the absolute angular measurement range there are 13 $\theta_{WSME2}$ (corresponding to 13 SME2) and 25 $\theta_{WSME1}$ (corresponding to 25 SME1).

In relation to the illustrations of FIGS. 4 and 6, the following discussion is in regard to considerations for choosing values for Y1' and Y2' relative to Y0'. If Y1' and Y2' (of FIG. 6) are selected to be greater than (e.g., above) Y0', then the radii RD1 and RD2 (of FIG. 4) will be larger than the radius RD0, and the scale element portions PRTSC1 and PRTSC2 (and the corresponding scale track portions TR1 and TR2) will be relatively larger (e.g., in general and/or in relation to the design of the transducer TDR'). In certain implementations, it may be desirable for the transducer TDR to be within certain size limits, for which it may be desirable to limit the maximum values of Y1' and Y2'. Another consideration may be in regard to certain printed circuit board (PCB) design rules (e.g., such as may result in limits as to how small certain elements and/or hole/element spacings, etc. may be made). For example, the transducer TDR' may have already been designed with the first scale element portion PRTSC1' and the corresponding relatively smaller signal modulating elements SME1' and linear spatial steps WSME1' as small as they can be made in accordance with PCB design rules. In such cases, a choosing of a value for Y1' that is greater than Y0' may help ensure that the sizing in the transducer TDR continues to adhere to the PCB design rules.

In contrast, if Y1' and Y2' (of FIG. 6) are selected to be smaller than (e.g., below) Y0', then the radii RD1 and RD2 (of FIG. 4) will be smaller than the radius RD0, and the scale element portions PRTSC1 and PRTSC2 (and the corresponding scale track portions TR1 and TR2) will be relatively smaller (e.g., in general and/or in relation to the design of the transducer TDR'). As noted above, in some configurations smaller sizes may run into issues with certain PCB design rules (e.g., such as may result in limits as to how small certain elements and/or hole/element spacings, etc. may be made). In regard to the second scale element portions PRTSC2' and PRTSC2, and in accordance with EQUATIONS 1-8, in implementations where the positive integer m is 2 or greater, it will be appreciated that the elements and spacings of the second scale element portions PRTSC2' and PRTSC2 are relatively larger (e.g., in relation to the elements and spacings of the first scale element portions PRTSC1' and PRTSC1. In this regard, the elements and spacings of the second scale element portions PRTSC2' and PRTSC2 may be able to better tolerate some amount of reduced sizes/shrinking (e.g., with Y2' smaller than Y0') while still being within the size/spacing requirements of the PCB design rules.

In certain implementations (e.g., as illustrated in the example of FIGS. 5 and 6), Y1' may be selected to be larger, and Y2' may be selected to be smaller, than Y0'. More specifically, if Y1' (of FIG. 6) is selected to be larger than (e.g., above) Y0', then the radii RD1 (of FIG. 4) will be larger than the radius RD0, and the scale element portion PRTSC1 (and the corresponding scale track portion TR1) will be relatively larger (e.g., in general and/or in relation to the design of the transducer TDR'). As noted above, in some implementations, such selection may help ensure that the first scale element portion PRTSC1 and the corresponding relatively smaller signal modulating elements SME1 continue to adhere to the PCB design rules. In addition, if Y2' (of FIG. 6) is selected to be smaller than (e.g., below) Y0', then the radii RD2 (of FIG. 4) will be smaller than the radius RD0, and the scale element portion PRTSC2 (and the corresponding scale track portion TR2) will be relatively smaller (e.g., in general and/or in relation to the design of the transducer TDR'). As noted above, in some implementations, such selection may be acceptable, in that the elements and spacings of the second scale element portion PRTSC2, which may relatively larger than those of the first scale element portion PRTSC1 (e.g., in particular in implementations where m=2 or greater) may be able to better tolerate some amount of smaller/reduced/shrinking sizes, while still being within the size/spacing requirements of the PCB design rules.

In various implementations, certain considerations may also be applied for determining/choosing the radius RD0. One consideration is the product size/dimension requirements (i.e., for the measuring instrument 100) and/or the maximum angular movement range $\theta_{MAX}$ (e.g., for the movement stroke of the movable encoder portion MEP). A larger value for the radius RD0 may generally correspond to better angular resolution of the encoder 101/transducer TDR, but may also require a larger movement stroke of the movable encoder portion MEP to measure a given angular range. A smaller value for the radius RD0 will tend to exaggerate the growing/shrinking effects noted above for the choosing of the values for Y1' and Y2' relative to Y0'.

Figure 7:
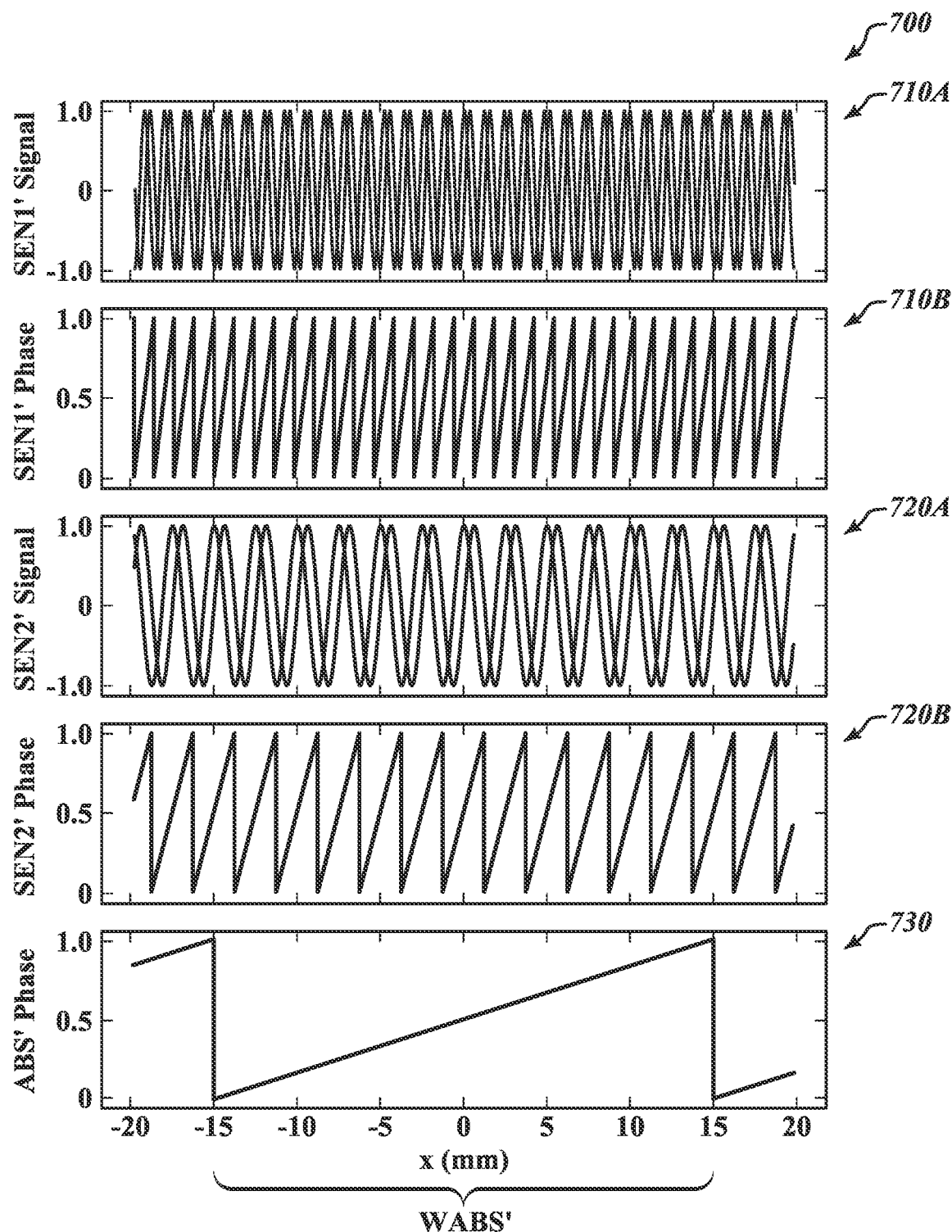
FIG. 7 is a diagram illustrating certain signals resulting from the operation of the transducer of FIG. 5 with linear motion between the detector portion and the scale portion.

FIG. 7 is a diagram illustrating certain signals resulting from the operation of the transducer TDR' of FIG. 5 with linear motion between the detector portion 167' and the scale portion 170'. As shown in FIG. 7, a graph 710A illustrates SEN1' signals as a function of linear position (e.g., along the x-axis direction, which may also be characterized as the scale direction and/or the measuring axis direction). In various implementations, the signals of the graph 710A may correspond to the detector signals SIG1A' and SIG1B' of the transducer portion PRTTDR1' of the first track portion TR1'. A graph 720A similarly illustrates SEN2' signals as a function of linear position. In various implementations, the signals of the graph 720A may correspond to the detector signals SIG2A' and SIG2B' of the transducer portion PRTTDR2' of the second track portion TR2'. Graphs 710B and 720B illustrate phase signals for the SEN1' and SEN2' signals of the graphs 710A and 720A, respectively (i.e. from calculating the arctan(SIG×B/SIG×A)).

A graph 730 illustrates an absolute ABS' phase signal (e.g., as resulting from a combining of the other signals, such as including those of the graphs 710B and 720B). In various implementations, the absolute ABS' phase signal may be represented according to $\phi_{ABS'}=\phi_{SIG1'}-m\phi_{SIG2'}$. As indicated in the graph 730, the absolute linear measurement range WABS extends over a range from −15 mm to +15 mm, as corresponding to an absolute range of 30 mm. As noted above, within the 30 mm range, there may be 25WSME1' (i.e., with WSME1'=1.2 mm) and 12WSME2' (i.e., with WSME2'=2.5 mm). Correspondingly, in the graphs 710A and 710B, there are 25 cycles illustrated within the −15 mm to +15 mm range, and in the graphs 720A and 720B, there are 12 cycles illustrated within the −15 mm to +15 mm range.

Figure 8:
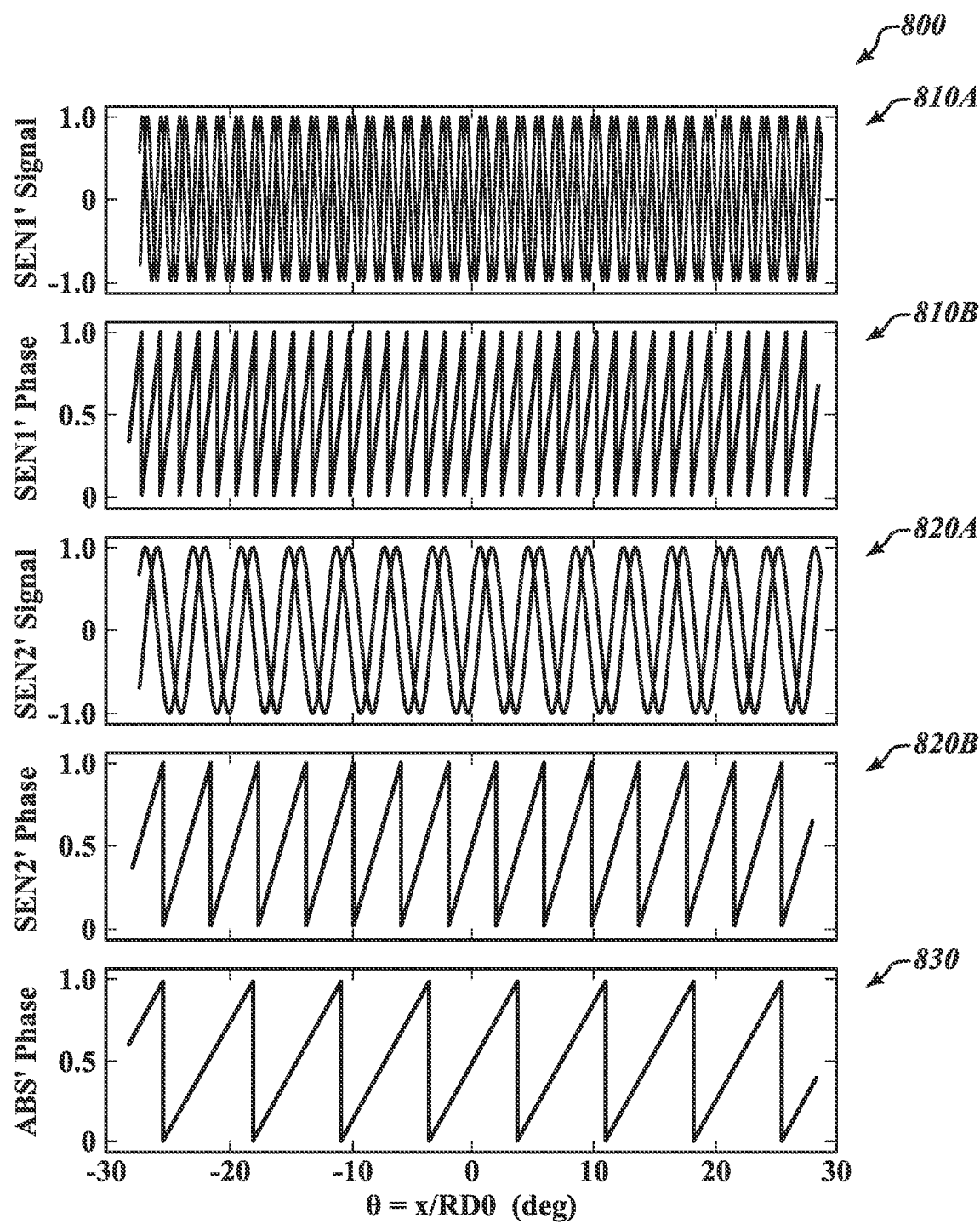
FIG. 8 is a diagram illustrating certain less desirable signals resulting from the operation of the transducer of FIG. 5 with arc motion between the detector portion and the scale portion and as may be compared to the more desirable signals of FIG. 7.

FIG. 8 is a diagram illustrating certain less desirable signals resulting from the operation of the transducer TDR' of FIG. 5 with arc motion between the detector portion 167' and the scale portion 170' and as may be compared to the more desirable signals of FIG. 7. An example of an implementation with arc motion would be if the transducer TDR' was utilized in the measuring instrument 100 of FIG. 2 and/or was substituted for the transducer TDR in the arc motion implementation of FIG. 4. As noted above, the transducer TDR' is configured and designed to be utilized with linear motion, and so the utilization with arc motion results in certain undesirable effects, as will be described in more detail below.

As shown in FIG. 8, a graph 810A illustrates SEN1' signals as a function of angular position (e.g., along an arc-shaped scale direction). In various implementations, the signals of the graph 810A may correspond to the detector signals SIG1A' and SIG1B' of the transducer portion PRTTDR1' of the first track portion TR1'. A graph 820A similarly illustrates SEN2' signals as a function of angular position. In various implementations, the signals of the graph 820A may correspond to the detector signals SIG2A' and SIG2B' of the transducer portion PRTTDR2' of the second track portion TR2'. Graphs 810B and 820B illustrate phase signals for the SEN1' and SEN2' signals of the graphs 810A and 820A, respectively.

A graph 830 illustrates an absolute ABS' phase signal (e.g., as resulting from a combining of the other signals, such as including those of the graphs 810B and 820B). In various implementations, the absolute ABS' phase signal may be represented according to $\phi_{ABS'}=\phi_{SIG1'}-m\phi_{SIG2'}$. As compared to the graph 730 of FIG. 7, the graph 830 indicates that the ABS' phase signal has a cycle of approximately 7 degrees (e.g., which is significantly less than the absolute angular measurement range $\theta_{ABS}$ of approximately 43 degrees for the transducer TDR of FIGS. 3 and 4 as described above). As one example, it can be envisioned that if the transducer TDR' of FIG. 6 (e.g., with the scale element portions PRTSC1' and PRTSC2' of the track portions TR1' and TR2' that are of approximately equal length) was substituted into the configuration of FIG. 4, each angle of arc motion would correspond to a relatively longer amount of the first scale element portion PRTSC1' and a relatively shorter amount of the second scale element portion PRTSC2'.

This effect can also be seen in the graphs 810A, 810B, 820A and 820B as compared to the graphs 710A, 710B, 720A and 720B (and as compared to the graphs 910A, 910B, 920A and 920B of FIG. 9, as will be described in more detail below). More specifically, in FIG. 8, over a 43 degree relative angular movement range (e.g., as will be described in more detail below with respect to FIG. 9), such as extending from −21.5 degrees to +21.5 degrees, it can be seen that relatively more cycles occur for the SEN1' signals (i.e., of the first track portion TR1'), and relatively fewer cycles occur for the SEN2' signals (i.e., of the second track portion TR2'). More specifically, in FIGS. 7 and 9, while the absolute measurement range (e.g., of 30 mm and 43 degrees, respectively) has approximately 25 SEN1' signal cycles and 12 SEN2' signal cycles, in FIG. 8 the graphs illustrate a greater number of SEN1' signal cycles (e.g., over 26) and a fewer number of SEN2' signal cycles (e.g., approximately 11). The ABS' phase signal of the graph 830 illustrates the results of this effect, wherein rather than achieving the desirable absolute angular measurement range $\theta_{ABS}$ of approximately 43 degrees, the ABS' phase signal has several cycles within that range, for a corresponding absolute angular measurement range $\theta_{ABS}$ of approximately 7 degrees. These issues illustrate some of the drawbacks/challenges of including a multi-track transducer that is configured/designed for utilization with linear motion in an application with arc motion.

Figure 9:
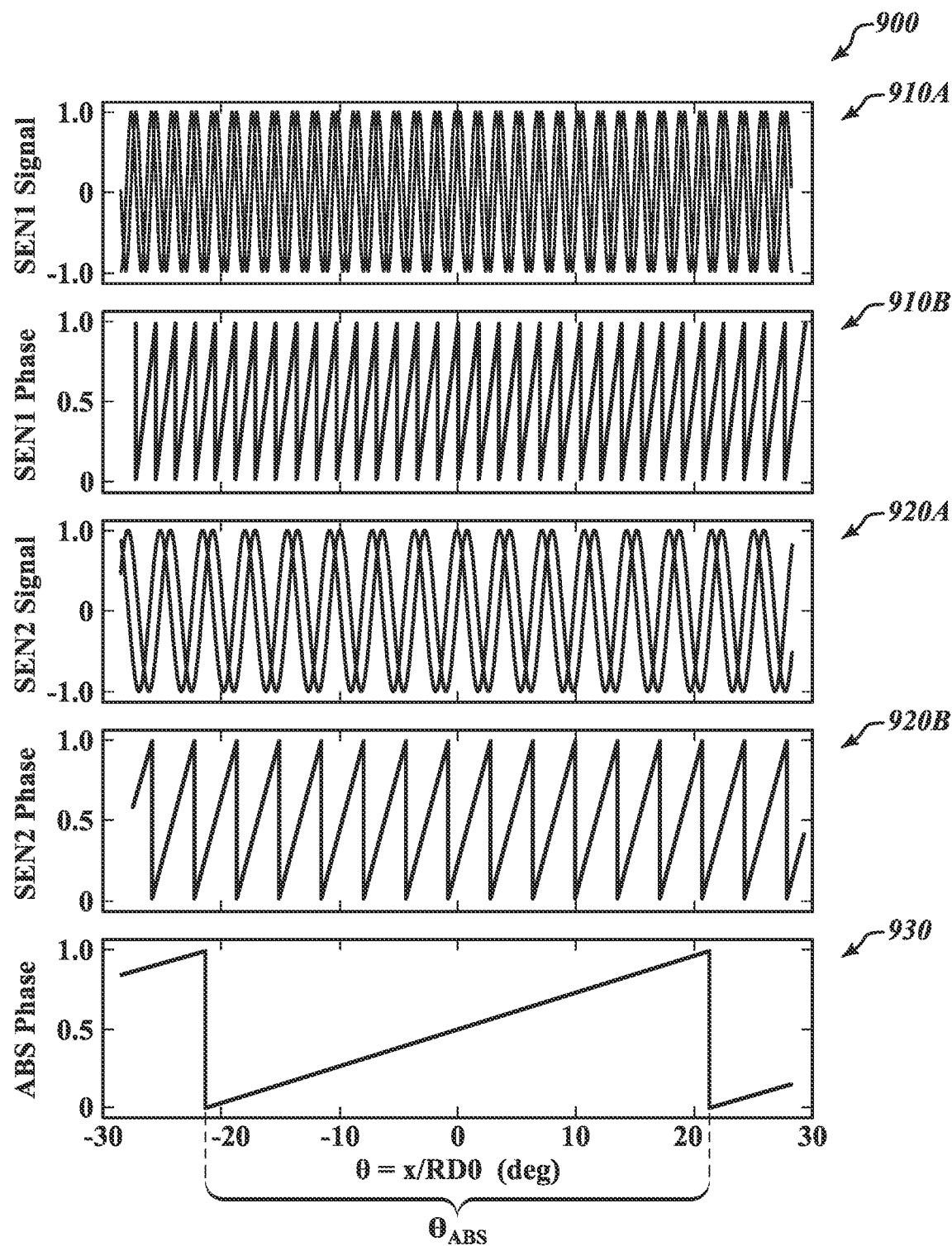
FIG. 9 is a diagram illustrating certain signals resulting from the operation of the transducer of FIG. 3 with arc motion between the detector portion and the scale portion and which are noted to be similar to the desirable signals of FIG. 7.

FIG. 9 is a diagram illustrating certain signals resulting from the operation of the transducer TDR of FIG. 3 with arc motion between the detector portion 167 and the scale portion 170 and which are noted to be similar to the desirable signals of FIG. 7. As shown in FIG. 9, a graph 910A illustrates SEN1 signals as a function of angular position. In various implementations, the signals of the graph 910A may correspond to the detector signals SIG1A and SIG1B of the transducer portion PRTTDR1 of the first track portion TR1. A graph 920A similarly illustrates SEN2 signals as a function of angular position. In various implementations, the signals of the graph 920A may correspond to the detector signals SIG2A and SIG2B of the transducer portion PRTTDR2 of the second track portion TR2. Graphs 910B and 920B illustrate phase signals for the SEN1 and SEN2 signals of the graphs 910A and 920A, respectively.

The graph 930 illustrates an absolute ABS phase signal (e.g., as resulting from a combining of the other signals, such as including those of the graphs 910B and 920B). In various implementations, the absolute ABS phase signal may be represented according to $\phi_{ABS} = \phi_{SIG1} - m\phi_{SIG2}$. As indicated in the graph 930, the absolute angular measurement range $\theta_{ABS}$ extends over a range from −21.5 degrees to +21.5 degrees, as corresponding to an absolute angular range of 43 degrees. Correspondingly, in the graphs 910A and 910B, there are 25 cycles (e.g., corresponding to 25 SME1's in the first scale element portion PRTSC1 of the first track portion TR1) illustrated within the −21.5 degrees to +21.5 degrees angular range, and in the graphs 920A and 920B, there are 12 cycles (e.g., corresponding to 12 SME2's in the second scale element portion PRTSC2 of the second track portion TR2) illustrated within the −21.5 degrees to +21.5 degrees angular range.

It will be appreciated that the signals illustrated by the graphs of FIGS. 7 and 9 are basically equivalent (i.e., as resulting from the linear motion implementation of FIG. 7 and the arc motion implementation of FIG. 9). These illustrate the effectiveness of a type of conversion that may be performed to change the design of one to the design of the other. In contrast, as noted above, FIG. 8 illustrates certain other issues/challenges that may occur if a transducer that is designed for utilization with linear motion is not converted in such a manner and is instead utilized as-is in an implementation with arc motion.

It will be appreciated that in accordance with the principles as described herein, an absolute angular measurement range $\theta_{ABS}$ may be tailored/configured for a particular maximum angular movement range $\theta_{MAX}$ for a particular application. The above specific numerical examples illustrate an arrangement configured for an absolute angular measurement range $\theta_{ABS}$ of 43 degrees, although it will be appreciated that other arrangements may be configured for larger or smaller absolute angular measurement ranges in accordance with principles as described above. In some implementations, smaller absolute angular measurement ranges may be utilized for particular applications (e.g., ranges smaller than 15 degrees, or 10 degrees, or 5 degrees).

It will be appreciated that the ability to tailor the absolute angular measurement range $\theta_{ABS}$ for a particular application may have certain advantages. For example, for a multi-track transducer, a design for a longer absolute angular measurement range generally requires a certain level of resolution and precision in order to be able to achieve the longer range (e.g., with appropriate and distinct signal levels over the full range, such as with a high level of information accuracy required for each increment, in particular in regard to the relationships between the multiple track portions (e.g., TR1 and TR2), in order for each increment to be distinguishable over the full range). In contrast, for a relatively shorter absolute angular measurement range in a multi-track transducer (e.g., such as may be formed in accordance with principles as described herein), a higher level of resolution may be achieved over the smaller range (e.g., utilizing smaller and/or otherwise different increments/spatial steps between the multiple tracks that could otherwise be too fine and/or have other issues for a longer range) and/or sufficient accuracy may be achieved over the smaller range utilizing an implementation with lower complexity/cost/power requirements, etc.

In some implementations, a comparison may be made to absolute rotary encoders which have an integer number of angular spatial steps in each track portion around a full 360 degree absolute range (e.g., in order to function effectively for continually measuring angular position in implementations where full 360 degree rotations and beyond may be performed). In accordance with such principles, if a portion of such a rotary encoder is utilized in an arc motion application (e.g., if ¼ or ⅛ of such a rotary encoder is utilized for a measurement range of 90 degrees, or 45 degrees), the angular spatial steps in each track portion will still correspondingly divide evenly into 360 degrees. For example, if a portion of a such a rotary encoder is being utilized, for each track portion in the transducer, 360 degrees divided by the given angular spatial step of the track portion will equal an integer number.

Such implementations utilizing a portion of a rotary encoder are noted to have certain drawbacks (e.g., as noted above, a design for a relatively longer measurement range such as the full 360 degree angular measurement range generally requires a certain level of resolution and precision in order to be able to achieve the full 360 degree range, in particular in regard to the relationships between the track portions, in order for each increment to be distinguishable). In contrast, as noted above, an arc motion encoder may be formed in accordance with principles as described herein with a relatively smaller absolute angular measurement range (i.e., that is less than 360 degrees, and in some implementations may be smaller such as less than 45 degrees, or 15 degrees, or 5 degrees), and which has certain advantages such as those noted above.

Figure 10:
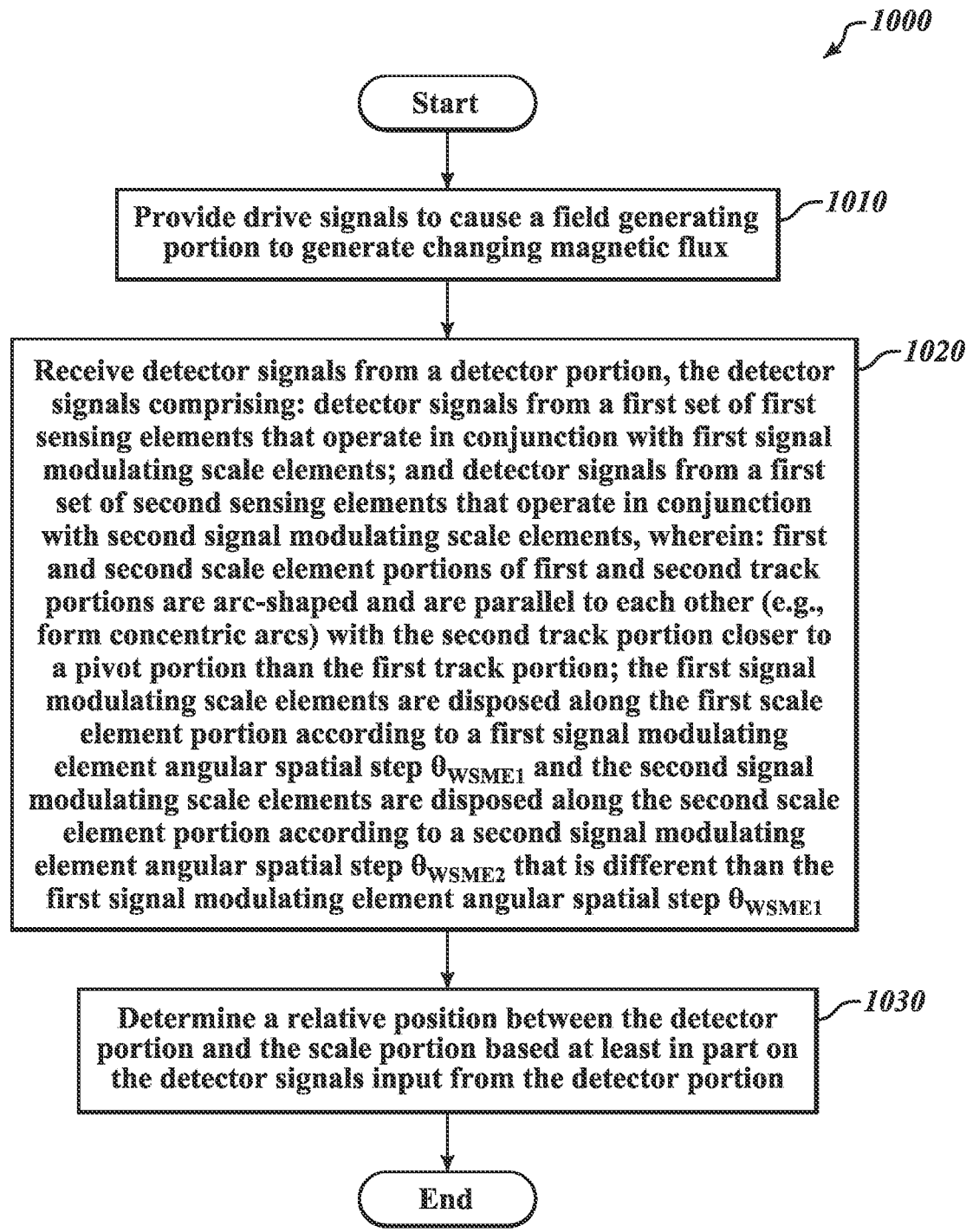
FIG. 10 is a flow diagram illustrating a method for operating a measuring instrument with arc motion between a detector portion and a scale portion.

FIG. 10 is a flow diagram illustrating a method 1000 for operating a measuring instrument with arc motion between a detector portion and a scale portion. The method includes generally three blocks (steps). Block 1010 includes providing drive signals to cause a field generating portion PRTFGE to generate changing magnetic flux. Block 1020 includes receiving detector signals from a detector portion 167, wherein the detector signals include: detector signals from a first set of first sensing elements SET1SEN1 that operate in conjunction with first signal modulating scale elements SME1; and detector signals from a first set of second sensing elements SET1SEN2 that operate in conjunction with second signal modulating scale elements SME2. First and second scale element portions PRTSC1 and PRTSC2 of first and second track portions TR1 and TR2 are arc-shaped and are parallel to each other (e.g., form concentric arcs) with the second track portion TR2 closer to a pivot portion PPN than the first track portion TR1. The first signal modulating scale elements SME1 are disposed along the first scale element portion PRTSC1 according to a first signal modulating element angular spatial step $\theta_{WSME1}$ and the second signal modulating scale elements SME2 are disposed along the second scale element portion PRTSC2 according to a second signal modulating element angular spatial step $\theta_{WSME2}$ that is different than the first signal modulating element angular spatial step $\theta_{WSME1}$. Block 1030 includes determining a relative position between the detector portion 167 and the scale portion 170 based at least in part on the detector signals input from the detector portion 167.

In relation to the operations at the block 1030 for determining a relative position between the detector portion (167) and the scale portion (170) based at least in part on the detector signals from the detector portion, various processing and/or signal combining techniques may be utilized (e.g., as will be understood by one skilled in the art and at least in part in accordance with the teachings in the incorporated references). Briefly, in various implementations two drive operations may be utilized for producing and processing the signals from the detector portion. In various implementations, the two drive operations may be performed simultaneously, or with different timings.

More specifically, as part of a first drive operation, the first field generating element portion PRTFGE1 may be driven (e.g., with corresponding drive signals from the signal processing configuration 166). As the first field generating element portion PRTFGE1 is driven, corresponding signals (e.g., signals SIG1A and SIG1B) from the first sensing elements SEN1 of the first sensing element portion PRTSEN1 of the detector portion may be read (e.g., received, processed, etc.). As part of a second drive operation, the second field generating element portion PRTFGE2 may be driven (e.g., with corresponding drive signals from the signal processing configuration 166). As the second field generating element portion PRTFGE2 is driven, corresponding signals (e.g., signals SIG2A and SIG2B) from the second sensing elements SEN2 of the second sensing element portion PRTSEN2 of the detector portion may be read (e.g., received, processed, etc.). The detector signals (i.e., from the detector portion) produced during the first and second drive operations may be utilized to determine a relative position (e.g., an absolute position between the detector portion and the scale portion). In various implementations, the detector signals may include four signals (e.g., SIG1A, SIG1B, SIG2A, SIG2B) that may be utilized for determining the relative position, such as the signals SIG1A and SIG1B of the first drive operation, and the signals SIG2A and SIG2B of the second drive operation.

As used herein, the term "nominally" encompasses variations of one or more parameters that fall within acceptable tolerances. As an example, in one implementation a term such as "nominally" may correspond to a minimal variance from a specified value (e.g., such as a variance of less than 5%, or less than 2%, or less than 1%, such as in accordance with acceptable tolerances, etc.).

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A measuring instrument, comprising:
   a movable portion configured to rotate in an arc motion about a pivot portion, the movable portion comprising a movable encoder portion, for which a maximum movement range of the arc motion of the movable encoder portion is less than 360 degrees; and
   an electronic position encoder configured to measure an absolute relative position between a detector portion and a scale portion, wherein the movable encoder portion comprises one of the detector portion or the scale portion, the electronic position encoder comprising:
      the scale portion extending along a scale direction, the scale portion comprising:
         a first scale element portion comprising first signal modulating scale elements; and
         a second scale element portion comprising second signal modulating scale elements; and
      the detector portion configured to be proximate to the scale portion with relative movement between the detector portion and the scale portion resulting from the arc motion of the movable encoder portion, the detector portion comprising:
         a field generating portion configured to generate changing magnetic flux in response to drive signals; and
         a sensing portion comprising:
            a first sensing element portion comprising a first set of first sensing elements and arranged in a first track portion with the first scale element portion; and a second sensing element portion comprising a first set of second sensing elements and arranged in a second track portion with the second scale element portion;

wherein:

the first and second scale element portions of the first and second track portions are arc-shaped and are parallel to each other, with the second track portion closer to the pivot portion than the first track portion;

the first signal modulating scale elements are disposed along the first scale element portion according to a first signal modulating element angular spatial step $\theta_{WSME1}$ and the second signal modulating scale elements are disposed along the second scale element portion according to a second signal modulating element angular spatial step $\theta_{WSME2}$ that is different than the first signal modulating element angular spatial step $\theta_{WSME1}$; and the electronic position encoder is configured such that:

an operating of the first track portion comprises the first set of first sensing elements providing detector signals which respond to a local effect on a changing magnetic flux provided by first signal modulating scale elements of the first scale element portion; and an operating of the second track portion comprises the first set of second sensing elements providing detector signals which respond to a local effect on a changing magnetic flux provided by second signal modulating scale elements of the second scale element portion.

2. The measuring instrument of claim 1, further comprising a signal processing configuration that is operably connected to the detector portion to provide the drive signals and that is configured to determine the absolute relative position between the detector portion and the scale portion based at least in part on detector signals input from the detector portion, the detector signals including detector signals from the first set of first sensing elements and detector signals from the first set of second sensing elements.

3. The measuring instrument of claim 1, wherein the field generating portion comprises:

a first field generating element portion that is arranged in the first track portion and is configured to operate in conjunction with first signal modulating scale elements of the first scale element portion and the first sensing elements of the first sensing element portion; and a second field generating element portion that is arranged in the second track portion and is configured to operate in conjunction with second signal modulating scale elements of the second scale element portion and the second sensing elements of the second sensing element portion.

4. The measuring instrument of claim 1, wherein the first scale element portion is arranged with a centerline at a first radius RD1 from the pivot portion and the second scale element portion is arranged with a centerline at a second radius RD2 from the pivot portion, for which the first radius RD1 is larger than the second radius RD2.

5. The measuring instrument of claim 1, wherein the first and second scale element portions define a corresponding absolute angular range $\theta_{ABS}$.

6. The measuring instrument of claim 5, wherein a ratio of the signal modulating element angular spatial steps $\theta_{WSME2}/\theta_{WSME1}$ can be expressed in accordance with being equal to at least one of the following equations:

$(nm/(n-1))$;

$(nm/(n+1))$;

$((nm+1)/n)$;

$((nm-1)/n)$;

for which n and m are positive integers.

7. The measuring instrument of claim 6, wherein m is a positive integer that is at least 2.

8. The measuring instrument of claim 5, wherein the absolute angular range ABS is equal to one of $n\theta_{WSME1}$ or $n\theta_{WSME2}$, where n is a positive integer, and the absolute angular range $\theta_{ABS}$ is less than 360 degrees.

9. The measuring instrument of claim 1, wherein the first scale element portion has an arc length ARC1 and is arranged at a first radius RD1 from the pivot portion, and the second scale element portion has an arc length ARC2 and is arranged at a second radius RD2 from the pivot portion, for which ARC2/ARC1=RD2/RD1.

10. The measuring instrument of claim 1, wherein $\theta_{WSME2}$ is larger than $\theta_{WSME1}$.

11. The measuring instrument of claim 1, wherein:

the first sensing element portion further comprises one or more additional sets of first sensing elements, for which each additional set of first sensing elements has a spatial phase offset relative to the first set of first sensing elements; and the second sensing element portion further comprises one or more additional sets of second sensing elements, for which each additional set of second sensing elements has a spatial phase offset relative to the first set of second sensing elements.

12. The measuring instrument of claim 1, wherein the first and second signal modulating scale elements comprise conductive plates and the first and second sensing elements comprise conductive loops.

13. The measuring instrument of claim 1, wherein the field generating portion comprises:

a first field generating element portion arranged in the first track portion and configured to operate in conjunction with the first sensing element portion and with first signal modulating scale elements of the first scale element portion, the first field generating element portion comprising:

a first field generating element first half loop with an interior area that is configured to be aligned with a first half pattern portion of the first scale element portion; and a first field generating element second half loop with an interior area that is configured to be aligned with a second half pattern portion of the first scale element portion, wherein the first field generating element first half loop and the first field generating element second half loop are configured to have current flows in opposite directions around the respective loops; and a second field generating element portion arranged in the second track portion and configured to operate in conjunction with the second sensing element portion and with second signal modulating scale elements of the second scale element portion, the second field generating element portion comprising:

a second field generating element first half loop with an interior area that is configured to be aligned with a first half pattern portion of the second scale element portion; and a second field generating element second half loop with an interior area that is configured to be aligned with a second half pattern portion of the second scale element portion, wherein the second field generating element first half loop and the second field generating element second half loop are configured to have current flows in opposite directions around the respective loops.

14. A method for operating a measuring instrument, the measuring instrument comprising:

a movable portion which rotates in an arc motion about a pivot portion, the movable portion comprising a movable encoder portion, for which a maximum movement range of the arc motion of the movable encoder portion is less than 360 degrees;

an electronic position encoder configured to measure an absolute relative position between a detector portion and a scale portion, wherein the movable encoder portion of the moveable portion comprises one of the detector portion or the scale portion, the electronic position encoder comprising:

the scale portion extending along a scale direction, the scale portion comprising:

a first scale element portion comprising first signal modulating scale elements; and a second scale element portion comprising second signal modulating scale elements; and the detector portion configured to be proximate to the scale portion with relative movement between the detector portion and the scale portion resulting from the arc motion of the movable encoder portion, the detector portion comprising:

a field generating portion configured to generate changing magnetic flux in response to drive signals; and a sensing portion comprising:

a first sensing element portion comprising a first set of first sensing elements and arranged in a first track portion with the first scale element portion; and a second sensing element portion comprising a first set of second sensing elements and arranged in a second track portion with the second scale element portion;

the method comprising:

providing the drive signals to cause the field generating portion to generate changing magnetic flux; and receiving detector signals from the detector portion, the detector signals comprising:

detector signals from the first set of first sensing elements that operate in conjunction with first signal modulating scale elements, wherein the operating of the first set of first sensing elements in conjunction with first signal modulating scale elements includes the first set of first sensing elements providing the detector signals which respond to a local effect on a changing magnetic flux provided by first signal modulating scale elements of the first scale element portion; and detector signals from the first set of second sensing elements that operate in conjunction with second signal modulating scale elements, wherein the operating of the first set of second sensing elements in conjunction with second signal modulating scale elements includes the first set of second sensing elements providing the detector signals which respond to a local effect on a changing magnetic flux provided by second signal modulating scale elements of the second scale element portion, wherein:

the first and second scale element portions of the first and second track portions are arc-shaped and are parallel to each other, with the second track portion closer to the pivot portion than the first track portion; and the first signal modulating scale elements are disposed along the first scale element portion according to a first signal modulating element angular spatial step $\theta_{WSME1}$ and the second signal modulating scale elements are disposed along the second scale element portion according to a second signal modulating element angular spatial step $\theta_{WSME2}$ that is different than the first signal modulating element angular spatial step $\theta_{WSME1}$.

15. The method of claim 14, further comprising determining a relative position between the detector portion and the scale portion based at least in part on the detector signals input from the detector portion.

16. The method of claim 14, wherein $\theta_{WSME2}$ is larger than $\theta_{WSME1}$.

17. The method of claim 14, wherein:

the first sensing element portion further comprises one or more additional sets of first sensing elements, for which each additional set of first sensing elements has a spatial phase offset relative to the first set of first sensing elements; and the second sensing element portion further comprises one or more additional sets of second sensing elements, for which each additional set of second sensing elements has a spatial phase offset relative to the first set of second sensing elements.

18. An electronic position encoder configured to measure an absolute relative position between a detector portion and a scale portion and to be utilized in a measuring instrument that comprises a movable portion configured to rotate in an arc motion, the electronic position encoder comprising:

the scale portion extending along a scale direction, the scale portion comprising:

a first scale element portion comprising first signal modulating scale elements; and a second scale element portion comprising second signal modulating scale elements; and the detector portion configured to be proximate to the scale portion with relative movement between the detector portion and the scale portion resulting from the arc motion of the movable portion, for which a maximum movement range of the arc motion is less than 360 degrees, the detector portion comprising:

a field generating portion configured to generate changing magnetic flux in response to drive signals; and a sensing portion comprising:

a first sensing element portion comprising a first set of first sensing elements and arranged in a first track portion with the first scale element portion; and a second sensing element portion comprising a first set of second sensing elements and arranged in a second track portion with the second scale element portion;

wherein:
the first and second scale element portions of the first and second track portions are arc-shaped and are parallel to each other, with the second track portion closer to the pivot portion than the first track portion; and the first signal modulating scale elements are disposed along the first scale element portion according to a first signal modulating element angular spatial step $\theta_{WSME1}$ and the second signal modulating scale elements are disposed along the second scale element portion according to a second signal modulating element angular spatial step $\theta_{WSME2}$ that is different than the first signal modulating element angular spatial step $\theta_{WSME1}$; and wherein at least one of:
the first scale element portion is arranged with a centerline at a first radius RD1 from the pivot portion and the second scale element portion is arranged with a centerline at a second radius RD2 from the pivot portion, for which the first radius RD1 is larger than the second radius RD2; or the first sensing element portion further comprises one or more additional sets of first sensing elements, for which each additional set of first sensing elements has a spatial phase offset relative to the first set of first sensing elements, and the second sensing element portion further comprises one or more additional sets of second sensing elements, for which each additional set of second sensing elements has a spatial phase offset relative to the first set of second sensing elements.

19. The electronic position encoder of claim 18, wherein:
an operating of the first track portion comprises the first set of first sensing elements providing detector signals which respond to a local effect on a changing magnetic flux provided by first signal modulating scale elements of the first scale element portion; and
an operating of the second track portion comprises the first set of second sensing elements providing detector signals which respond to a local effect on a changing magnetic flux provided by second signal modulating scale elements of the second scale element portion.

20. The electronic position encoder of claim 18, wherein:
the first sensing element portion comprises the one or more additional sets of first sensing elements and the second sensing element portion comprises the one or more additional sets of second sensing elements;
the one or more additional sets of first sensing elements comprises a second set of first sensing elements that is arranged in the first track portion with the first scale element portion and has a spatial phase offset relative to the first set of first sensing elements; and
the one or more additional sets of second sensing elements comprises a second set of second sensing elements that is arranged in the second track portion with the second scale element portion and has a spatial phase offset relative to the first set of second sensing elements.

* * * * *